United States Patent
Wira

(10) Patent No.: US 7,678,339 B2
(45) Date of Patent: Mar. 16, 2010

(54) FINE PARTICLE POWDER PRODUCTION

(76) Inventor: Kurnia Wira, 8 Lakepoint Drive #03-48, Singapore (SG) 648926

( * ) Notice: Subject to any disclaimer, the term of this patent is extended or adjusted under 35 U.S.C. 154(b) by 507 days.

(21) Appl. No.: 10/590,818

(22) PCT Filed: Feb. 28, 2005

(86) PCT No.: PCT/SG2005/000057
§ 371 (c)(1),
(2), (4) Date: Jun. 26, 2007

(87) PCT Pub. No.: WO2005/082520
PCT Pub. Date: Sep. 9, 2005

(65) Prior Publication Data
US 2007/0280863 A1    Dec. 6, 2007

(30) Foreign Application Priority Data
Feb. 28, 2004   (SG)  .............................. 200400806-6

(51) Int. Cl.
*B01J 10/00*       (2006.01)
*C09C 1/00*        (2006.01)
*B22F 1/00*        (2006.01)
*B22F 1/02*        (2006.01)
*B01J 19/08*       (2006.01)

(52) U.S. Cl. ...................... 422/129; 422/150; 422/151; 422/186.04; 422/186.22; 422/186.26; 75/346; 75/351

(58) Field of Classification Search ................. 422/129, 422/150, 151, 186.26, 186.04, 186.22; 110/185, 110/186; 264/414; 219/121.52; 75/346, 75/351
See application file for complete search history.

(56) References Cited

U.S. PATENT DOCUMENTS

| | | | | |
|---|---|---|---|---|
| 3,496,280 A | * | 2/1970 | Kappmeyer | .................. 164/48 |
| 3,602,439 A | * | 8/1971 | Nakayama | .................. 241/39 |
| 4,484,943 A | * | 11/1984 | Miura et al. | .................. 75/351 |
| 4,617,055 A | * | 10/1986 | Miura et al. | ................ 428/403 |
| 4,982,067 A | * | 1/1991 | Marantz et al. | ........ 219/121.47 |
| 4,998,486 A | * | 3/1991 | Dighe et al. | ................ 110/346 |

(Continued)

FOREIGN PATENT DOCUMENTS

WO    WO95/03907    2/1995

(Continued)

OTHER PUBLICATIONS

PCT International Search Report dated Apr. 12, 2005 in regards to corresponding PCT Application No. PCT/SG2005/000057 filed on Feb. 28, 2005.

*Primary Examiner*—Walter D Griffin
*Assistant Examiner*—Huy-Tram Nguyen
(74) *Attorney, Agent, or Firm*—Ohlandt, Greeley, Ruggiero & Perle, L.L.P.

(57) ABSTRACT

A vaporised flow quenching reactor for producing a fine-powder from one or more reactant materials. The reactor comprises a first heat source selected from one of a DC plasma torch and RF plasma torch, a first reaction chamber within which energized reactant materials react and a first convergent-divergent nozzle for quenching the heated reactant materials from the first reaction chamber. The reactor also comprises a second reaction chamber provided for congregation of nano particles formed therefrom and a second convergent-divergent nozzle to deliver the nano particles to a collection chamber.

43 Claims, 11 Drawing Sheets

U.S. PATENT DOCUMENTS

| | | | |
|---|---|---|---|
| 5,111,656 A * | 5/1992 | Simon et al. | 60/203.1 |
| 5,640,843 A * | 6/1997 | Aston | 60/203.1 |
| 5,707,419 A * | 1/1998 | Tsantrizos et al. | 75/336 |
| 5,749,937 A * | 5/1998 | Detering et al. | 75/10.19 |
| 5,874,134 A * | 2/1999 | Rao et al. | 427/446 |
| 2003/0021746 A1 | 1/2003 | Fincke et al. | 423/610 |

FOREIGN PATENT DOCUMENTS

| | | |
|---|---|---|
| WO | WO96/28577 | 9/1996 |
| WO | WO0073247 | 12/2000 |
| WO | WO01/46067 | 6/2001 |
| WO | WO02/088179 | 11/2002 |
| WO | WO03/106094 | 12/2003 |

* cited by examiner

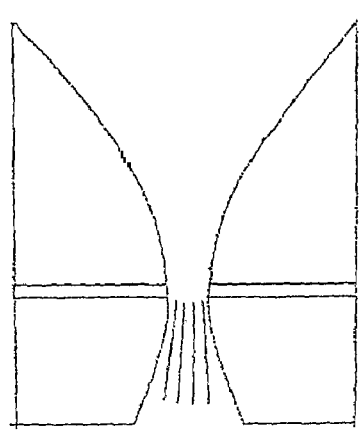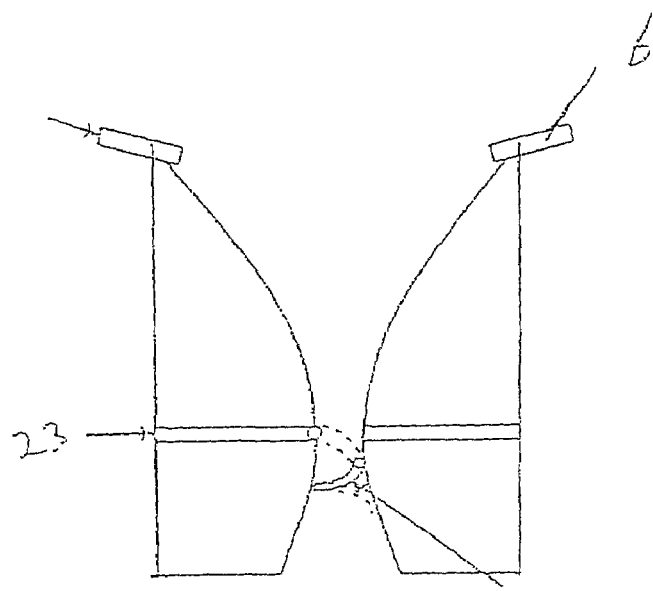
Fig 3
(prior Art)
Fig 4

FINE PARTICLE POWDER PRODUCTION

BACKGROUND

Nano structure science and technology is becoming a field of technology important to the economy. Nano particle production and its application is becoming a key aspect to old and emerging technology as more and more development to nano powder is occurring. Nano particles are a technology enabler having application in a vast array of industrial, domestic and commercial situations. For example nano particles are able to be utilised as a coating material to improve the wear resistance, the transparency and ultraviolet absorption as a coating to material. Nano particles can be used in the semiconductor industry to improve the polishing process of semiconductor components to achieve a high quality output. Nano particles are also utilised to increase the variety of gases that can be detected by a gas sensor as a result of increasing sensitivity. Nano particles can also be used in paint, cosmetics, and tooling industry. Nano particles have also found a place in the medical field and are utilised to enable drug delivery.

Nano particles have been classified as particles of a size less than 100 nm. It is at a particle size below 100 nm that such particles have displayed novel chemical and physical properties which in particle sizes above 100 nm are not (or are not as prominently) displayed by the material of the same or similar chemical makeup.

As a result of the small particle size a nano powder consisting of nano particles does not need to be heated to a temperature as high as larger particle size powder in order for it to be reactive for example for the coating of other products. There is accordingly an energy saving that can be provided by the use of nano powder thereby lowering the costs of the application of such materials to other materials. This is however only an extremely small part of the advantages due to its nano-size when used for spraying. The biggest advantages come from its very large relative surface area so that the material properties are dominated by surface properties instead of normal/classical bulk property.

The nano particle production industry currently utilises two distinct processes or a hybrid of such distinct processes. The first process is commonly known as the physical/dry process. The physical/dry process involves the subjecting of a precursor feed material or materials to an energy source.

The physical/dry process includes heat and mechanical energy as an energy source. The heat source is used to evaporate the precursor material or materials (referred to as the primary elements or compounds) and then reacts with secondary elements or compounds, if necessary to form the desired output compound. The heat source may include plasma, laser, flame, hot-box or oven, etc. The primary purpose of the heat source is to evaporate and dissociate the feed stock and provide necessary conditions for the subsequence reactions to carry out the synthesizing processes. The various heat sources have certain properties that may not be available by others. For example, laser provide clean environment but the cost of operation is high. Flame or a hot box provides an inexpensive heat source but is limited by its achievable temperature and cleanliness. A plasma heat source will provide a relatively inexpensive yet clean heat source.

Mechanical processing to create nano particles are also known and such can include a ball mill or grinding device as for example referenced to in U.S. Pat. No. 3,937,405. In mechanical processing the impact of the particles with like particles results in a reduction in particle size. Milling elevates the energy of the particles which both breaks down the particle size and allows for solid chemistry energisation for conversion of a compound to occur. Likewise U.S. Pat. No. 3,602,439 describes the use of a supersonic jet mill for producing extra fine and uniform powder from a precursor material by pulverising the material by mutual collision and friction of the material in a supersonic jet stream.

The second process technique for the creation of nano particles is a chemical/wet process which utilises the careful control of an environment to cause a reaction at the ionic level. Chemical processes known to those in the industry include colloid chemistry, sol-gel processes, precipitation processes such as hydrolysis or hydrothermal processes and micro emulsion.

Existing nano particle production devices which use a plasma source to evaporate material, pass the heated reacted gases and particle product through a convergent/divergent nozzle. The primary purpose of such a nozzle is to encourage the cooling of the particles that have been generated by their being subjected to the plasma energy source. The divergent part of the nozzle results in a decrease in pressure of the flow stream with a resultant reduction in stream temperature. Such cooling is known as adiabatic cooling. U.S. Pat. No. 4,484,943 describes such a nozzle.

Plasma energy is also known to be useful in production of reactive powder. For example particle spraying apparatus utilise a plasma source for generating the energy to create a high temperature sufficient to react the precursor material for the generation of small particles. They generally use a plasma screen which comprises of an arrangement for striking an electric arc between a pair of electrodes. A gas under pressure is passed between the pair of electrodes and through the arc to be passed through a nozzle. In a plasma arc torch of a non-transfer kind (unlike a transfer kind often utilised for cutting and welding) an arc is struck between a rear electrode (commonly a cathode) and a forward electrode that forms the exit nozzle of the plasma stream.

The common form of such non transfer torch, is a DC-plasma which is mainly used and has application for thermal spraying coating. The 'exit nozzle' serves the purpose to increase the velocity of the flow to achieve a good coating. U.S. Pat. No. 5,901,551 describes a torch where a jet nozzle has provided at its inlet a plasma generating electrode. The exit nozzle serves the purpose of accelerating the flow to high speeds such as to supersonic speeds.

U.S. Pat. No. 5,111,656, U.S. Pat. No. 5,640,843 and U.S. Pat. No. 5,901,551 disclose an arc jet nozzle through which the flow of fluid is a vortex flow. It has been identified in for example U.S. Pat. No. 5,901,551 that the purpose of the vortex is to enhance efficiency of the nozzle. The nozzle is used for the provision of thrust to the material stream passing therethrough. The nozzle described in U.S. Pat. No. 4,911,805 is mainly to accelerate the fine particle to high speed and strike onto the second material (target or substrate) and create coating. Commonly such nozzles are used in spraying technology and are used to control the flow stream and the velocity of the stream. Nozzles of spraying technology are not used for the cooling down of the particles flowing therethrough thereby inhibiting their growth and their inelastic collision capabilities such as required for sintering and do not endeavour to slow down or stop the flow and reaction of particles. This is not the objective of nano particle production.

Furthermore such nozzles are provided at the source of the plasma arc and do not include an intermediate reaction chamber between the plasma arc and the nozzle where the plasma subjected precursor feed material is able to react. Usually the vortex is provided for the purposes of enhancing the mixing of the gases, to create greater path length and also more uniform discharge to increase electrode lifetime. Increased lifetime results from the movement of the arc root (being a point discharge) by the vortex flow. If the arc root location does not change, the electrodes are easily pitted and hence shortened in life. The vortex through the arc jet nozzle will ensure the arc root moves from place to place and also stabilises the arc column. Hence the vortex is not used in cooling of the flow but to ensure the arc roots move from place to place and also stabilized the arc column.

Plasma torches come in the form of a DC/AC plasma torch which is a high power and high temperature device useful for the purposes of ensuring that high melting temperature materials can be subjected to sufficient energy to ensure that the precursor stock feed (often of a particulate or powder size) can be sufficiently softened/moltened and/or vaporised and accelerated to high velocities by the plasma device. Other forms of plasma torches include the RF plasma torch which is a lower energy density unit. RF (radio frequency) plasma provides cleaner but lower energy density plasma when compare to DC (direct current) plasma.

Current nano powder devices generally operate at supersonic speeds through the expansion nozzle. Operating at supersonic speeds provides for good quenching characteristics. High quenching characteristics of a nozzle is important in making small sized particles. There is a direct relationship between the degree of quenching and the resultant size of the particles. If less efficient quenching occurs through a nozzle the particle sizes will be larger i.e. the better the quenching the smaller the particle sizes. The degree of quenching may also be resultant in other characteristics such as particle shape or chemical makeup. As well known in physical particle chemistry, particles colliding with each other in an elastic manner do not react to engage with each other however in an inelastic manner, particles colliding with each other will encourage particle growth. However for inelastic growth, particles need to have reached a certain kinetic energy. There is a minimum threshold energy level that is required to be achieved before particle growth will occur. Such minimum threshold energy level varies for different materials. As a result many nano powder production devices currently available are designed and set up for the production of one particular type of powder. Reaction chambers and nozzle shapes and speeds therethrough are setup particular for the production of specific nano particles. The degree of cooling also has a potential to change the resultant morphology of a particle as quenching rate will affect the material crystal growth. Very fast quenching will result in amorphous, non-crystal structure, material. However a problem exists with the volume of material that can be put through a convergent/divergent nozzle at supersonic speeds. This problem relates to the choking of the flow at supersonic speeds. Choking is a common phenomenon of supersonic flow nozzles. Whilst supersonic flow nozzles present great quenching characteristics, the total heat transfer is limited as a result of a reduced flow rate that can be put through the supersonic nozzle because of the choking phenomenon.

In order to achieve supersonic flow speeds, based on 1-dimensional flow with adiabatic expansion:

$M^2=(u/a)^2=\{(P_0/P)^{[(\gamma-1)/\gamma]}-1\}[2/(\gamma-1)]$ where u is the velocity of the fluid; a is the local acoustic velocity at the outlet; $P_0$ is the upstream chamber pressure and P is the downstream chamber pressure; and $\gamma$ is the ratio of specific heats of the fluid; and M (mach number) exceeds 1 (supersonic) when ratio $P_0/P$ is greater the critical ratio of pressure (>2 for ideal gas where $\gamma=1.67$). Similarly, the throat area is also governed by $A/A^*=(1/M)\{[2/(\gamma+1)][1+M^2(\gamma-1)/2]\}^{[(\gamma+1)/2(\gamma-1)]}$ where A and A* are the of diverging outlet and throat cross-section area.

In order to achieve high quench rate, the A/A* should be high and hence the throat cross-section is small that leads to constrain for the higher flow-rate.

U.S. Pat. No. 5,749,937 describes the use of a nozzle as a quencher which moves the material within the stream outside the "reaction threshold region" or sometimes called the "threshold thermal energy" for the purposes of titanium powder production from $TiCl_4$. U.S. Pat. No. 5,749,937 however does not make reference to nano sized particle. U.S. Pat. No. 5,749,937 furthermore describes the additional gas injection as part of a reactant gas mixture for the purposes of completing the reaction but such occurs after the throat and downstream of the nozzle. Such additional gas injection is provided to avoid the back reaction by cooling the flow stream.

A further technique involves in the creation of nano particles is the forming of a powder both in the form of an alloy or in the form of a coating, also known as packaging. U.S. Pat. No. 4,687,611, U.S. Pat. No. 4,533,383, U.S. Pat. No. 4,484,943 and U.S. Pat. No. 5,093,148 describe the formation of such. U.S. Pat. No. 4,533,393 describes an alloying application of nano powder technology. U.S. Pat. No. 4,533,383 has the reaction of the two materials to be alloyed occurring downstream of the divergent/convergent nozzles. Synthesis occurs at the collision zone of the two flow streams after the nozzles. U.S. Pat. No. 4,484,943 is absent of reference to the use of a plasma jet for reacting with raw material. Furthermore only one heat source to heat the propellant gas, in this case nitrogen, is provided.

Packaging of small particles is described in U.S. Pat. No. 4,617,055. Two in series reaction chambers are described but again there does not appear to be a disclosure of two separate heat sources of a plasma jet kind. U.S. Pat. No. 4,617,055 describes a hotbox type heater for vapourising materials and this has the inherent disadvantages of contamination and temperature control hence affecting the output material. Commonly hotbox heaters are difficult to scale up as their heating elements are the limiting factor. Such are hence commonly used for batch production only. Furthermore, no ionisation occurs which is a phenomenon of plasma heating. As such the choice of raw materials is also more limited for hotbox type power producing machines.

In the two method as shown in U.S. Pat. No. 4,617,055, the second chamber is used mainly for controlling the chamber pressure ratio to achieve expansion cooling and control condensation temperature. A further method described in U.S. Pat. No. 4,617,055 is a series operation which has a lot of limitations such as the controlling of the second material evaporation and reaction with the first material, due to the hot box heating method. Another limitation seems to be that the operation of the first chamber is at 0.05 atm. The second chamber nozzle is fed by the first nozzle and the second furnace. Gas fed into the second chamber pressure has to be lower than the first chamber pressure in order to achieve the desired cooling rate. As the first chamber is running at 0.05 atm the second chamber pressure will have to be lower and hence limit the production rate and flexibility of operation. The reason the first chamber operates in such low pressure is due to the evaporation process for the hot box.

As a consequence the prior art known to the inventor has significant limitations in the types of materials that can be processed and produced as well as flexibility in adapting a particular device for the production of different sized, characteristic and/or compositions of materials. Known nano particle production devices are set up substantially permanently for the production of a particular nano particle which thereby limits the application that a particular device has and can result in a costly exercise in reconfiguring a machine for the production of different nano particles.

Accordingly it is an object of the present invention to provide a fine particle powder reactor and/or related process which has flexibility to allow for production of a number of alternative particles of varying composition or to at least provide the public with a useful choice.

It is also an object of the present invention to provide a quenching nozzle with improved efficiency over the prior art nozzles or at least provide the public with a useful choice.

BRIEF DESCRIPTION OF THE INVENTION

In a first aspect the present invention consists in a vapourised flow quenching reactor for producing a fine-powder from one or more reactant materials comprising (1) first heat creating means selected from one of a DC plasma torch and RF plasma torch, said first heat creating means including
- (i) a reactant stream inlet for at least one input material selected from at least one gas phase and at least one non gas phase material, said non gas phase material to be vapourised by said first heat creating means and
- (ii) a reactant stream outlet (2) a first reaction chamber to receive said gaseous reactant stream from said reactant stream outlet of said first heat creating means wherein in said first reaction chamber said mixing and/or reaction of said reactant stream occurs, said first reaction chamber including an outlet for said reactant stream (3) a first convergent-divergent nozzle to receive via an inlet thereof said reactant stream from said outlet of said first reaction chamber to rapidly cool the reactant stream axially flowing there through, as a result of adiabatic and isentropic expansion of the reactant stream, said first convergent-divergent nozzle including an outlet for said reactant stream (4) a second reaction chamber including
- (i) a first inlet to receive said reactant stream of material from said outlet of said first convergent-divergent nozzle, and
- (ii) a second inlet for delivery of a second reaction stream into said second reaction chamber, said second reaction stream having been generated by second heat creating means selected from one of a DC plasma torch and RF plasma torch, said second heat creating means including
  - (a) a reactant stream inlet for at least one input material selected from at least one gas phase and at least one non gas phase material, said non gas phase material to be vapourised by said second heat creating means and
  - (b) a second reactant stream outlet to deliver said second reactant stream via said second inlet of said second reaction chamber, into said second reaction chamber, and
- (iii) an outlet of said second reaction chamber (5) a second convergent-divergent nozzle to receive via an inlet thereof said resultant reactant stream (resultant from said first and/or second reactant streams) from said outlet of said second reaction chamber to rapidly cool the resultant reactant stream axially flowing there through as a result of adiabatic and isentropic expansion of the resultant reactant stream, said second convergent-divergent nozzle including an outlet for said reactant stream (6) a collection chamber to receive material from said outlet of said second convergent-divergent nozzle.

Preferably said second reaction chamber includes a third inlet to receive a non vapourised material.

Preferably said second reaction chamber includes a third inlet to receive a non vapourised material to be heated by said second heat creating means within said second reaction chamber.

Preferably said second inlet to said second reaction chamber allows said second heat creating means to extend its heat source into said second reaction chamber to active by heating at least part of any non or partially activated material within said second reaction chamber other than that delivered into said second reaction chamber via said second inlet of said second reaction chamber for the purposes of allowing such material to subsequently react with other material introduced into said second reaction chamber via at least one of said first inlet and said second inlet of said second reaction chamber.

Preferably said second inlet to said second reaction chamber allows said second heat creating means to extend its heat source into said second reaction chamber to active by heating at least part of any non or partially activated material within said second reaction chamber other than that delivered into said second reaction chamber via at least one of said second inlet and third inlet of said second reaction chamber for the purposes of allowing such material to subsequently react with other material introduced into said second reaction chamber via at least one of said first inlet and said second inlet and said third inlet of said second reaction chamber.

Preferably said first heat creating means is a DC plasma torch.

Preferably said first heat creating means is an RF plasma torch.

Preferably said second heat creating means is an RF plasma torch.

Preferably said second heat creating means is a DC plasma torch.

Preferably a collection chamber is positioned intermediate of the outlet of said first convergent-divergent and said first inlet of said second reaction chamber.

Preferably said first inlet to said second reaction chamber is disposed in a manner to encourage a rotational flow to be established within said second reaction chamber by said first heat creating origination reactant stream to encourage mixing thereof with any second heat source originating reactant stream.

Preferably the reactor can be operated in
i. a first mode wherein reactant flow through said first heat creating source is established and reactant flow through said second heat creating source is established, and
ii. a second mode wherein reactant flow through said first heat creating source is established and no reactant flow through said second heat creating source is established.

Preferably wherein reactor can be operated in
i. a first mode wherein reactant flow through said first heat creating source is established and reactant flow through said second heat creating source is established, and
ii. a third mode wherein no reactant flow through said first heat creating source is established and reactant flow through said second heat creating source is established.

Preferably reactor can be operated in
i. a first mode wherein reactant flow through said first heat creating source is established and reactant flow originating from said second heat creating source is established, and
ii. a fourth mode wherein reactant flow through said first heat creating source is established and no reactant flow from said second heat creating source is established and material is delivered via said third inlet to said second reaction chamber.

Preferably the reactor can be operated in
i. a fifth mode wherein reactant flow through said first heat creating source is established and reactant flow originating from said second heat creating source is established, and material is delivered via said third inlet to said second reaction chamber and
ii. a second mode wherein reactant flow through said first heat creating source is established and no reactant flow from said second heat creating source is established.

Preferably the reactor can be operated in
i. a fifth mode wherein reactant flow through said first heat creating source is established and reactant flow originating from said second heat creating source is established, and material is delivered via said third inlet to said second reaction chamber and
ii. a third mode wherein no reactant flow through said first heat creating source is established and reactant flow from said second heat creating source is established.
iii. A vapourised flow quenching reactor as claimed in any one of claims 12 to 16 wherein reactor can be operated in any one or more combinations of said first, second, third, fourth and firths modes.

Preferably said first divergent-convergent nozzle includes a means to inject a gas.

Preferably said first divergent-convergent nozzle includes a means to inject a gas.

Preferably said second divergent-convergent nozzle includes a means to inject a gas.

Preferably said second divergent-convergent nozzle and said first divergent-convergent nozzle includes a means to inject a gas.

Preferably either or both said means to inject a gas is a means to inject said gas at a tangent to the axial direction of said nozzle in order to generate a rotational to said axial direction flow through said nozzle.

Preferably either of both said means to inject a gas are proved to introduce said gas into said nozzle at the throat of said nozzle.

Preferably said means to inject a gas includes a plurality of injection openings into said nozzle.

Preferably said third inlet is presented to said second reaction chamber to direct flow of material there through into the path of flow of the reactant stream from said second inlet.

Preferably said third inlet is presented to said second reaction chamber to direct flow of material there through, not into the path of flow of the reactant stream from said second inlet.

Preferably said third inlet is presented to said second reaction chamber to allow the adjustability of said flow of material there through so allow said flow to be selectively directed either into or not into the path of flow of the reactant stream from said second inlet.

Preferably the flow of reactant through said second convergent/divergent nozzle is below supersonic speeds.

Preferably the flow of reactant through said first convergent/divergent nozzle is below supersonic speeds.

Preferably said at least one said torch both vapourises and ionises said input material.

In a further aspect the present invention consists in a fine powder production process including
a vapourised flow quenching reactor for producing a fine-powder from one or more reactant materials comprising
(1) first heat creating means selected from one of a DC plasma torch and RF plasma torch, said first heat creating means including
  (i) a reactant stream inlet for at least one input material selected from at least one gas phase and at least one non gas phase material, said non gas phase material to be vapourised by said first heat creating means and
  (ii) a reactant stream outlet
(2) a first reaction chamber to receive said gaseous reactant stream from said reactant stream outlet of said first heat creating means wherein in said first reaction chamber said mixing and/or reaction of said reactant stream occurs, said first reaction chamber including an outlet for said reactant stream
(3) a first convergent-divergent nozzle to receive via an inlet thereof said reactant stream from said outlet of said first reaction chamber to rapidly cool the reactant stream axially flowing there through, as a result of adiabatic and isentropic expansion of the reactant stream, said first convergent-divergent nozzle including an outlet for said reactant stream
(4) a second reaction chamber including
  (i) a first inlet to receive said reactant stream of material from said outlet of said first convergent-divergent nozzle, and
  (ii) a second inlet for delivery of a second reaction stream into said second reaction chamber, said second reaction stream having been generated by second heat creating means selected from one of a DC plasma torch and RF plasma torch, said second heat creating means including
    (a) a reactant stream inlet for at least one input material selected from at least one gas phase and at least one non gas phase material, said non gas phase material to be vapourised by said second heat creating means and
    (b) a second reactant stream outlet to deliver said second reactant stream via said second inlet of said second reaction chamber, into said second reaction chamber, and
  (iii) an outlet of said second reaction chamber
(5) a second convergent-divergent nozzle to receive via an inlet thereof said resultant reactant stream (resultant from said first and/or second reactant streams) from said outlet of said second reaction chamber to rapidly cool the resultant reactant stream axially flowing there through as a result of adiabatic and isentropic expansion of the resultant reactant stream, said second convergent-divergent nozzle including an outlet for said reactant stream
(6) a collection chamber to receive material from said outlet of said second convergent-divergent nozzle
wherein said process has a mode of operation selected from any one of
  i. a first mode wherein reactant flow through said first heat creating source is established and reactant flow through said second heat creating source is established, and
  ii. a second mode wherein reactant flow through said first heat creating source is established and no reactant flow through said second heat creating source is established, and
  iii. a third mode wherein no reactant flow through said first heat creating source is established and reactant flow from said second heat creating source is established.

Preferably said second reaction chamber includes a third inlet to receive a non vapourised material and wherein said including process may operate in a mode selected from any one of said first, second and third modes and
  i. a fourth mode wherein reactant flow through said first heat creating source is established and no reactant flow from said second heat creating source is established and material is delivered via said third inlet to said second reaction chamber.

Preferably said second reaction chamber includes a third inlet to receive a non vapourised material and wherein said including process may operate in a mode selected from anyone of said first, second, third and fourth modes and i. a firth mode wherein reactant flow through said first heat creating source is established and reactant flow originating from said second heat creating source is established, and material is delivered via said third inlet to said second reaction chamber.

Preferably said first divergent-convergent nozzle includes a means to inject a gas injecting a gas to generate a rotational to the axial direction flow through said third nozzle.

Preferably said second divergent-convergent nozzle includes a means to inject a gas to generate a rotational to the axial direction flow through said second nozzle.

In a further aspect the present invention consists in a method of using a vapourised flow quenching reactor for forming a packaged powder said method comprising;

passing a vapourised material by said first heat creation means gaseous flow entrained compound or element from said first reaction chamber through said first convergent/divergent nozzle to create a nano particle powder material which is delivered via said first inlet of said second reaction chamber where said nano particles are surface reacted by said second heat creation means to allow the reaction of said nano particles with a material (herein after "packaging material") introduced into said reaction chamber via said second inlet to become packaged by said packaging material where after said packaged nano particles are passed through said second convergent-divergent nozzle for collection in said collection chamber.

In a further aspect the present invention consists in a method of using a vapourised flow quenching reactor for forming a packaged powder said method comprising;

passing a vapourised material by said first heat creation means gaseous flow entrained compound or element from said first reaction chamber through said first convergent/divergent nozzle to create a nano particle powder material which is delivered via said first inlet of said second reaction chamber where said nano particles are surface reacted by said second heat creation means to allow the reaction of said nano particles with a material (herein after "packaging material") introduced into said reaction chamber via at least one of said second inlet and said third inlet to become packaged by said packaging material where after said packaged nano particles are passed through said second convergent-divergent nozzle for collection in said collection chamber.

In a further aspect the present invention consists in a method of using a vapourised flow quenching reactor for forming an alloyed powder said method comprising;

passing at least two vapourised materials by said first heat creation means gaseous flow entrained compound or element from said first reaction chamber through said first convergent/divergent nozzle to create an alloyed nano particle powder material which is delivered via said first inlet of said second reaction chamber.

In a further aspect the present invention consists in method of forming a packaged powder using a vapourised flow quenching reactor said method comprising;

passing a vapourised material by said first heat creation means gaseous flow entrained compound or element from said first reaction chamber through said first convergent/divergent nozzle to create a nano particle powder material which is delivered via said first inlet of said second reaction chamber where said nano particles are surface reacted by said second heat creation means to allow the reaction of said nano particles with a material (herein after "packaging material") introduced into said reaction chamber via said second inlet to become packaged by said packaging material where after said packaged nano particles are passed through said second convergent-divergent nozzle for collection in said collection chamber.

In a further aspect the present invention consists in a method of forming a packaged powder using a vapourised flow quenching reactor said method comprising;

passing a vapourised material by said first heat creation means gaseous flow entrained compound or element from said first reaction chamber through said first convergent/divergent nozzle to create a nano particle powder material which is delivered via said first inlet of said second reaction chamber where said nano particles are surface reacted by said second heat creation means to allow the reaction of said nano particles with a material (herein after "packaging material") introduced into said reaction chamber via at least one of said second inlet and said third inlet to become packaged by said packaging material where after said packaged nano particles are passed through said second convergent-divergent nozzle for collection in said collection chamber.

In a further aspect the present invention consists in a method of forming an alloyed powder using a vapourised flow quenching reactor said method comprising;

passing at least two vapourised materials by said first heat creation means gaseous flow entrained compound or element from said first reaction chamber through said first convergent/divergent nozzle to create an alloyed nano particle powder material which is delivered via said first inlet of said second reaction chamber.

In a further aspect the present invention consists in a convergent-divergent nozzle for quenching the flow of a heated gas flow entrained vapourised material (whether an elemental material or of a compound) for the purposes of producing a nano sized particle containing powder as a consequence of the rapid quenching of said vapourised material passing through said convergent-divergent nozzle said convergent-divergent nozzle including a means to affect the flow path of said heated gas flow entrained vapourised material through said convergent said convergent-divergent nozzle which includes an means to inject a flow of gas (herein after "flow modifying gas") into the flow path of said heated gas flow entrained vapourised material upstream of the divergent portion of said convergent-divergent nozzle which is injected via at least one delivery opening at an angle having a tangential component to the axial direction of said convergent-divergent nozzle.

Preferably said means to inject includes a plurality of delivery openings for injection of said flow modifying gas.

Preferably said means to inject is able to adjust the angle of said tangential component of flow to the path of said heated gas flow entrained vapourised material.

Preferably said means to inject is injected via at least one opening of said nozzle into the flow path of said heated gas flow entrained vapourised material at the throat of said nozzle.

Preferably said nozzle is one for operating at sub supersonic speeds.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

For the purposes of illustrating the invention, there is shown in the drawings a form which is presently preferred. It is being understood however that this invention is not limited to the precise arrangements shown.

BRIEF DESCRIPTION OF THE DRAWINGS

FIG. 3 is a sectional view through a prior art convergent/divergent nozzle, FIG. 4 is a sectional view through a convergent/divergent nozzle of the present invention wherein a vortex flow has been established to aid in the creation of a flow through with improved characteristics over the prior art nozzle of FIG. 3.

BRIEF DESCRIPTION OF THE INVENTION

Figure 1:
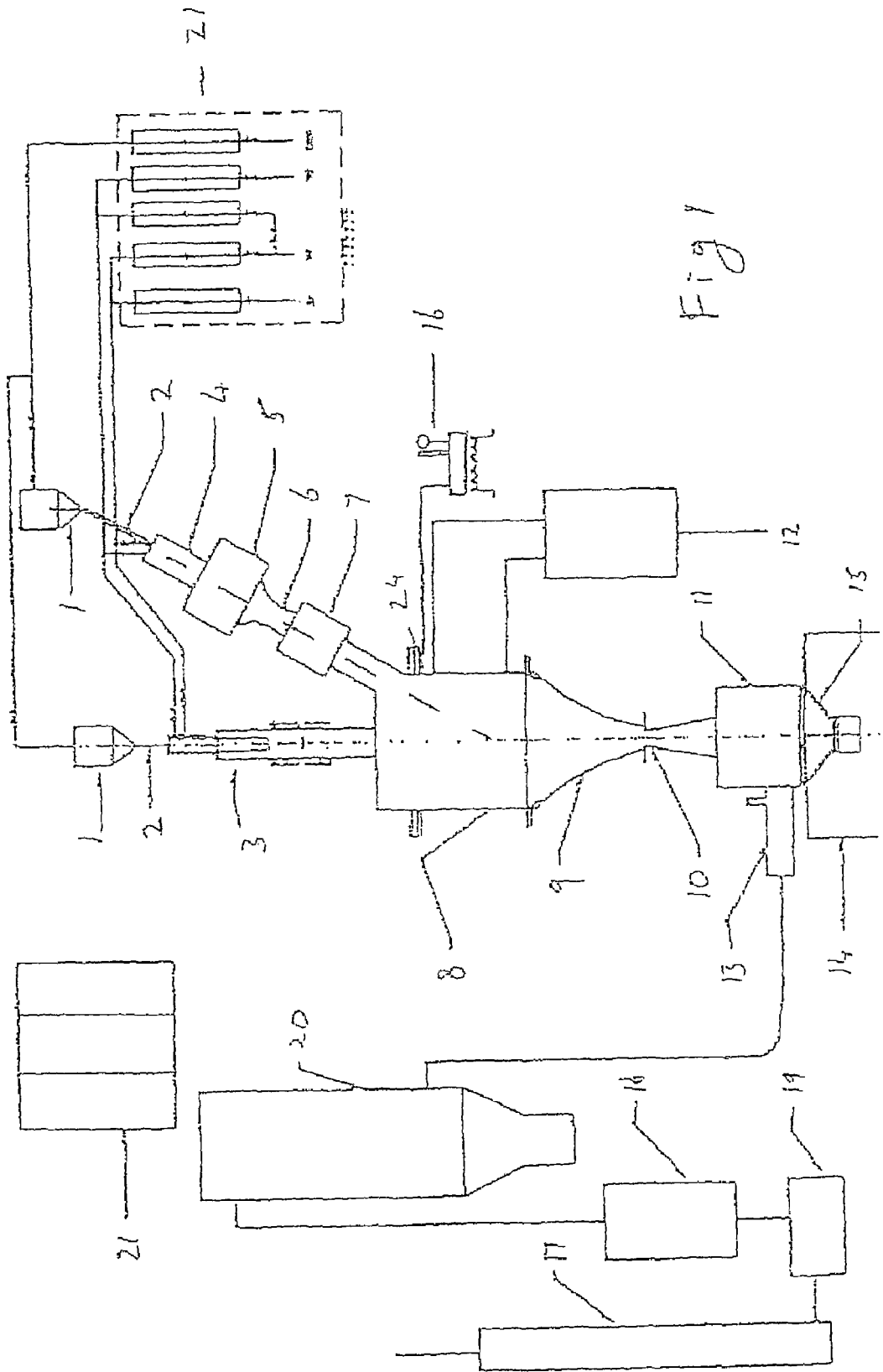
FIG. 1 is a schematic view of a layout of a plant for the manufacture of nano particles to create a nano powder in the forms as hereinafter described.

With reference to FIG. 1 there is shown a schematic of a system which incorporates the present invention.

It includes the provision of two sources for the energisation of feed materials (solid and/or gases). The first source of energisation is preferably a DC plasma torch. The DC plasma torch 4 is preferably of a twin V-shape DC plasma torch. Such a plasma torch may be in a V-shape arrangement where two plasma torches are directed at an angle to each other. The preferred DC-plasma system is acquired from Siberia Academy of Science, Russia. Such a DC plasma torch has two torches which are in a V-shaped configuration to each other to create two jet plasma streams. The two streams provide an electrical path to create a closed loop and generates at the region of collision of the two jets, a low pressure zone. Such a low pressure zone encourages the material injected and particles created at the energisation zone to remain within the zone due to its low pressure. This ensures that a high conversion rate is achieved.

The DC plasma torch normally requires during its operation the provision of a gas (being a primary gas and also referred to as a central gas which is normally an inert gas such as argon) for maintaining the plasma discharge. A secondary gas also referred to as the reaction gas may also be passed through the plasma torch and may be of a single component gas or a mixture of several gases depending on the final material to be synthesised.

Where both primary and secondary gases are utilised in the system, both are to pass through the plasma discharge in order to ensure that the temperature of the gases remains substantially the same. The secondary gas or gases form part of the plasma.

The primary gas is responsible to maintain the 'seed' of the plasma column and the secondary gas is to extent the plasma column to the desired parameters.

The primary gas can also be replaced with the secondary gas or gases as needed or where possible especially after the DC plasma torch has been started. Once the generation of plasma energy has been initiated, it may no longer be essential for the primary gas to be provided.

Figure 8:
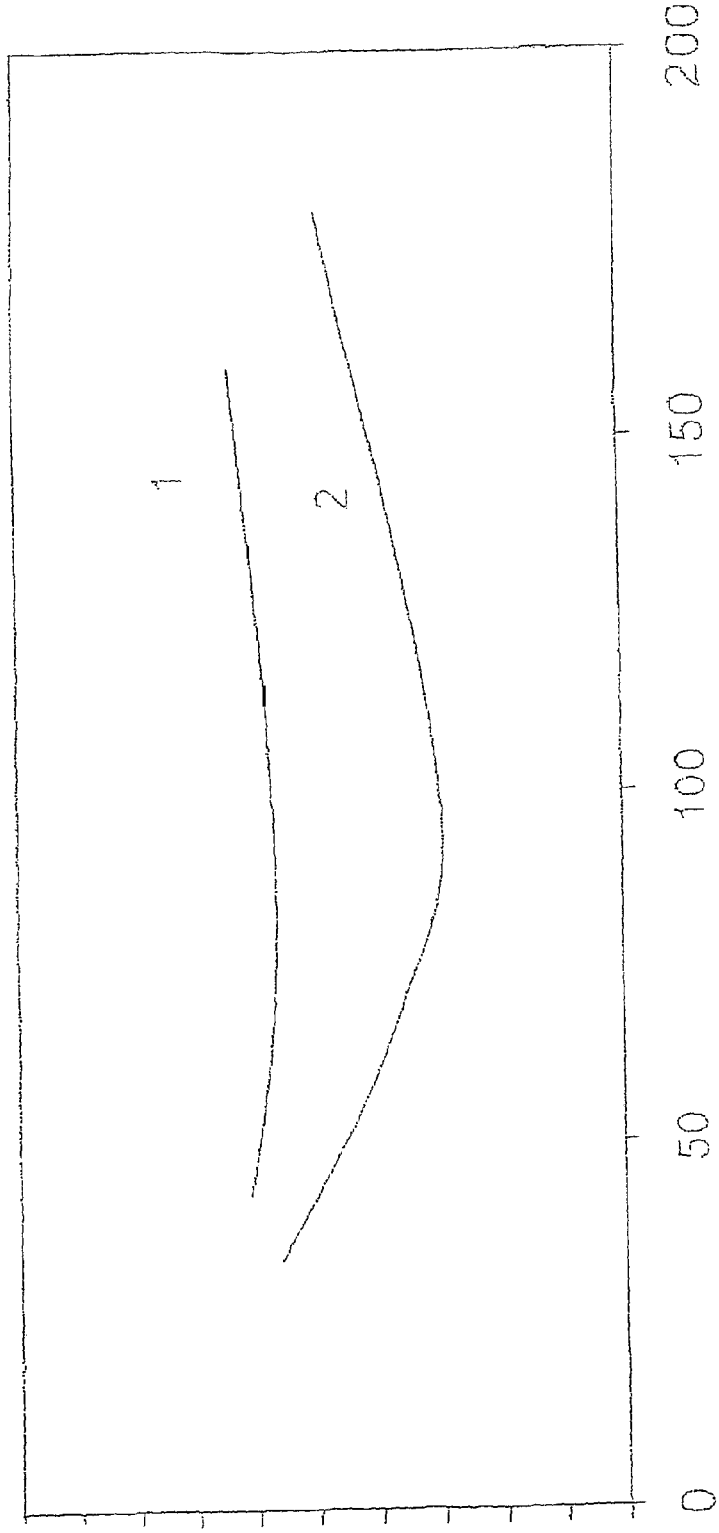
FIG. 8 shows manufactures IV plot of the DC plasma torch in operation where a primary (plasma) gas flow rate of 0.4 g/s of argon is established and a 4 g/s flow rate of a secondary (process gas) of nitrogen is established for plot 1 and where a primary gas flow rate of 0.4 g/s of argon is established and a 3 g/s flow rate of nitrogen is established for plot 2.
Figure 9:
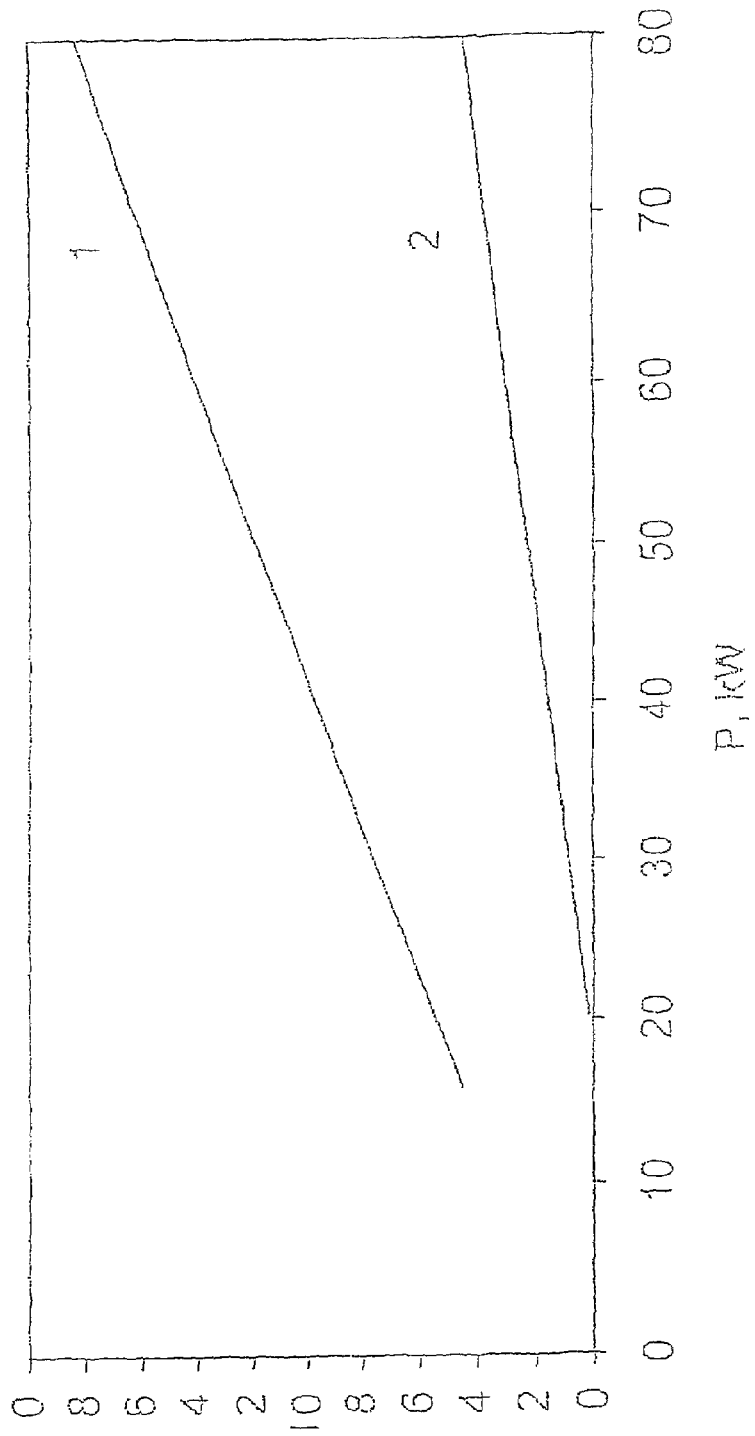
FIG. 9 is a manufactures plot of the DC plasma torch in operation showing the heat losses depending on power input.

Some of the performance characteristics of the preferred form of the DC plasma torch are shown in FIGS. 8 and 9.

A precursor stock feeder 2 is provided for the purposes of providing the precursor stock feed or raw material to the plasma torch. The raw material or materials may for example be of a metal, ceramic or chemical compound that contains the desired elements to be synthesised. It is possible for raw material to be fed into the device without synthesis occurring by the plasma but rather merely a conversion of the raw material to a smaller particle size without a change in the resulting composition of the material. For example, evaporation of pure metal from normal micron powder in an inert environment, such as Argon, can allow for the plasma generated metal vapour to transform to a nano-size. If there is only one metal, then no alloying will take place. On the other hand, if more than one raw material is evaporated together, an alloy may form according to the material selection rule.

The raw material can either be in the form of a solid, liquid, slurry or may be gaseous and is fed through the feeder 2 to be introduced to the region of plasma energy at the torch 4. The flow through the DC plasma torch delivers the then converted raw material from the plasma source energy region into a reaction chamber 5. This reaction chamber or nucleation chamber (the first reaction chamber) is a region in which the energised material energised by the plasma source (preferably fully evaporated by the plasma energy source) is able to react. The energised raw material being of a first composition is able to react with the second composition from the process gases formed from the secondary gas and/or primary gas sources provided through the plasma source to form the desired compound in atomic form within the first reaction chamber 5. As has been mentioned, alloying may also take place where two or more raw materials are fed through the DC source. The atomic form of the combining elements or compounds from the energised raw material(s) feed stock and from the process gases are able to react within the first reaction chamber 5 and grow to a desired particulate size within the first reaction chamber 5. When the heated fluid within the first reaction chamber (being a mixture of formed powder particles and of gas), passes through the downstream converging/diverging (CV) nozzle, the flow is quenched. The main purpose of the convergent/divergent nozzle is to stop the growth of particle size. Particles will have a threshold thermal energy beyond which particle growth due to particle inelastic collision can occur. By rapid cooling of the particles the particles are being taken out of the inelastic collision region and advance into an elastic collision region once in the elastic collision state, particle growth stops allowing the obtaining of small particles so quenching will freeze the growth of particles.

The C-V nozzle preferably operates at subsonic or transonic speeds yet still provides quenching conditions akin to those experienced by known supersonic C-V nozzles but at greater particle mass flow rates. In supersonic nozzles choking is a disadvantage phenomenon impacting on the maximum flow rate. Choking occurs when particles start to accumulate at the wall or when too much particle flow is encouraged through the orifice. For the supersonic nozzle, the critical cross-section (throat) is relatively small in order to achieve the high velocity. This cross-section will significantly limit the mass flow rate (both solid and gas) passing through the orifice, especially at the entrance of the orifice.

In order to allow for the nozzle to operate at subsonic or transonic speeds (being the speed of flow of particles through the nozzle in the axial direction), the nozzle has at its throat, a gas stream or streams injected by gas injectors. Such Is for example by the vortex generator 23. The nozzle is normally of a circular cross section (a cross section that lateral to the direction of general flow therethrough). The vortex generator 23 and preferably also the vortex generator 10, includes gas outlet ports to allow for gas injection into the nozzle preferably at the waist of the nozzle. Such gas injectors inject gas at a tangential angle and preferably lateral or at least non-parallel to the axial flow through the nozzle. The angle of injection may vary from tangential to nearly radial depending on requirements. The purpose of injection is to influence the critical cross section and hence the cooling effect without changing the physical nozzle. It is provided to improve flexibility of the system to allow for different flow rates for different materials and different sizes of materials to be generated by the device as a result of having an affect on the rate of cooling or quenching through the nozzle. By introducing a gas into the C-V nozzle at the waist, the critical cross section the effective cross section of the nozzle can be changed. The mass flow rates and the quenching effect change as a result of the change in cross sectional characteristics of the nozzle. A significant degree of flexibility is incorporated into the system of the present invention by allowing such cross section to change by the vortex generator. Indeed whilst in one preferred form the invention includes two plasma streams, preferably an RP and DC plasma stream, it has been found that the use of the nozzle incorporating a vortex generator in a single source plasma stream has significant advantages over the known prior art. Such includes the significant flexibility that is provided in a single nozzle system by the provision of a vortex generator. In addition to providing an effective variable geometry to the flow path of particles through the nozzle thereby providing flexibility to allow for a single nozzle to be adapted for the generation of different sized particles and/or different composition or physical structured particles, the introduction of an injected gas also aids in providing additional cooling to the particles flowing through the nozzle. In addition generation of a vortex through the nozzle enhances the flow path length of particles through the nozzle thereby giving particles more time to cool within the nozzle structure of the present invention.

In addition a vortex may also create a boundary layer to the nozzle downstream of the region of injection thereby providing a protective layer to parts of the nozzle. Injection points may range from one (and preferably two) to ten but are obviously restricted to the physical size of the nozzle. Gas injected substantially tangentially to the flow direction will establish a gas boundary layer through the nozzle beyond the point of injection of the vortex generator gas injector and thereby protect the process fluid (the mixture formed powder particles and the reaction gases) and prevent such from making direct contact with the nozzle wall. By reducing direct contact of the process fluid with the nozzle wall, contamination with any material which may dislodge from the nozzle from abrasive contact is reduced. Contact will increase contamination of the powder and also the probability of the particles adhering to the wall hence increasing the propensity for choking the gas flow.

The most significant effect in injecting gases via the vortex generators 23/10 at the nozzle throat is the influence such has on the critical cross-section (A* from the above equation). This hence affects the overall cooling effect. There may be provided at least one and preferably a plurality of such inlets at the throat section of the CV nozzle. In the preferred form there are provided two such inlets. The vortex generator 23 and/or 10 may also be for the cooling of the generated particles. In the preferred form the temperature of the injected gas is cold and should not be reactive. A gas such as Argon may be used but many non reactive gases may be suitable. The overall cooling effect depends on the relative velocity and density of injected gas and nozzle gas. The benefit of injecting gas is to increase the flexibility of control over the system and thus enables use of the same system in generating many types of powder.

With reference to FIG. 1, downstream from the convergent/divergent nozzle, there is provided the intermediate cooling chamber 7. The intermediate cooling chamber is a collection chamber for the collection of frozen particles and for the reaction gases that have passed through the convergent/divergent nozzle. The intermediate cooling chamber 7 serves as a place for temporary collection of particles prior to their passing to the second reaction/nucleation chamber 8. However, in an alternative form, an intermediate cooling chamber 7 is not provided. Such an alternative is for example shown in FIG. 2. In the alternative configuration shown in FIG. 2, the process fluids quenched by the C-V nozzle 6 pass directly into the second reaction/nucleation chamber 8. The intermediate chamber 7 is optional and it can be replaced by a conduit feeding to the second reaction/nucleation chamber 8. The provision of an intermediate chamber 7 is to allow for the adjusting of the particle condition before their entering the second chamber 8.

Figure 2:
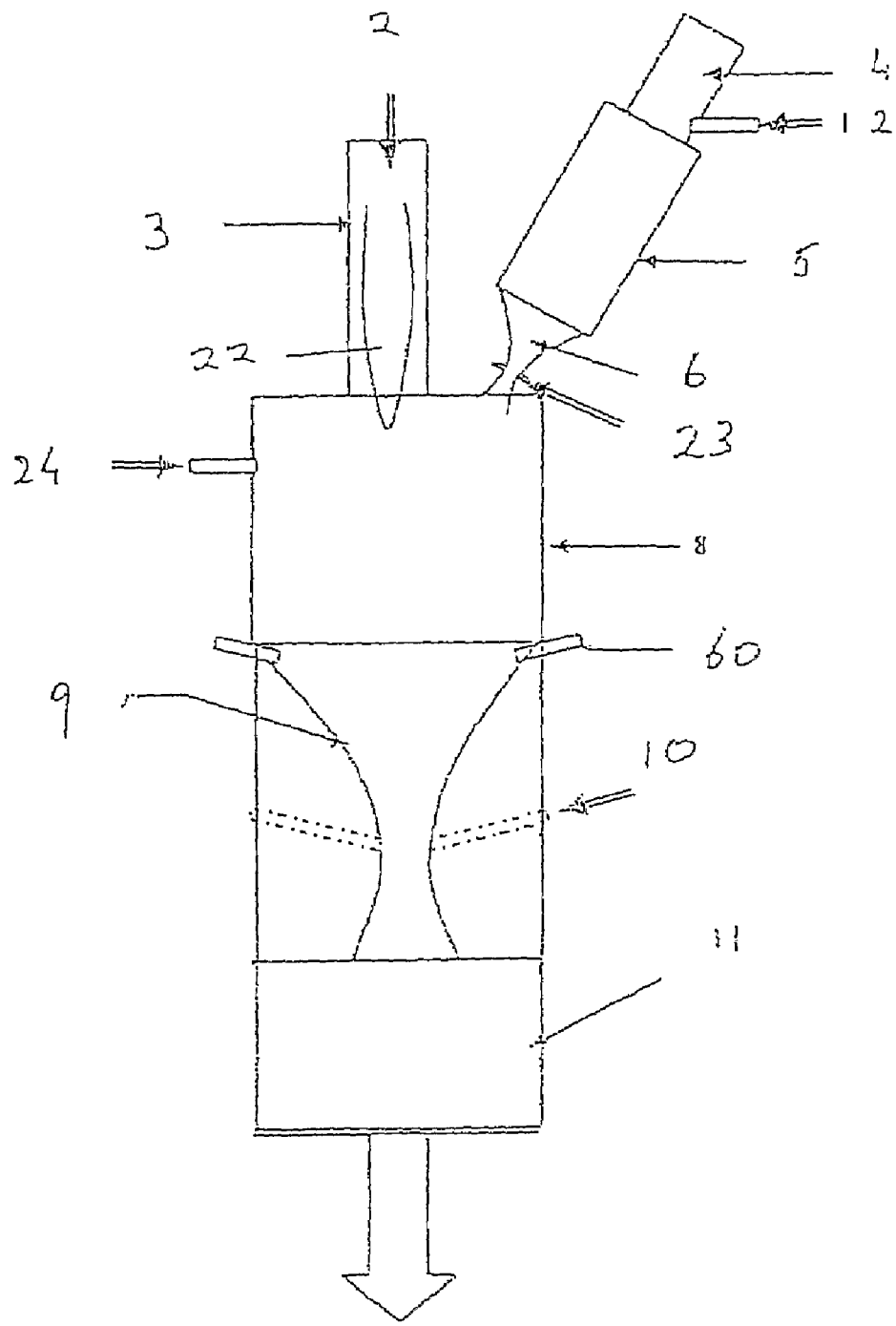
FIG. 2 is a more detailed view of nano powder creation and composition components of the schematic of FIG. 1 but wherein a variation exists in that the DC plasma nano particle generation component does not include an intermediate cooling chamber between the DC plasma path and the reaction chamber of the RF plasma energisation source.

The second reaction/nucleation chamber 8 is a region where the process fluid from the DC source plasma (having passed through the first convergent/divergent nozzle 6 and optionally the intermediate cooling chamber 7) is able to congregate. This of course assumes that the device of FIG. 1 or 2 is being operated in a mode where a particle flow from the DC plasma source is to be provided. It may however be that the device is operated in a mode where merely the second plasma torch 3 is in operation. Likewise the first plasma source and not the second may be operational. The second plasma source 3 is preferably an RF plasma torch. An RF plasma torch has a lower energy density than that of a DC plasma torch. However for purposes as will hereinafter be explained, a DC torch does not provide a convenient ability or efficient ability to achieve a surface activation of a particle since the DC source is generally of a much higher energy density. Whilst the second torch 3 is an RF torch, it may in an alternative form be a DC torch. Whilst and RF torch has a lower energy density it does consume more power and for particle creation rather than surface activation, it is preferred that the first torch 4 is a DC torch. However in an alternative form an RF torch may be used for the creation of certain particles in this part of the device. The preferred vortex flow through the nozzle may continue into the second reaction/nucleation chamber 8. Angled introduction of the plasma flow from the DC source flow path into chamber 8 may also encourage such further flow of material in a vortex like manner into the second reaction/nucleation chamber 8 to encourage mixing.

The second reaction/nucleation chamber 8 allows for the congregation of such nano particles within the chamber for a number of discrete purposes, such as packaging and alloying. The second reaction/nucleation chamber 8 is also a region where the first formed nano particles from the DC plasma flow stream are able to interact with a second material. Such a secondary reaction (preferably to result in packaging of the first formed material) is optional in the operation of the system. Flow of the first formed nano powder may pass through the second reaction/nucleation chamber 8 without reacting, through a second divergent/convergent nozzle 9 prior to being delivered to a collection region. However, in a first mode of operation (a packaging mode), the first formed nano particles (whether alloyed or not) delivered via the first nozzle 6 are collected within the second reaction/nucleation chamber 8 are able to interact with a second material which is delivered to the second reaction/nucleation chamber through a second plasma source flow stream and/or via an alternative inlet 24.

The device of the present invention can operate in a condition where raw material in solid or liquid or slurry phase is delivered into the reaction chamber 8 and activated by the RF plasma torch. Flow through the RF plasma torch may only be of the primary gases or the primary and reaction gases but with out there being a flow of raw material through the plasma nozzle. In such a mode of operation the plasma torch directed into the reaction chamber 8 activates the reaction gases passing through the torch (if any) and activates the material delivered through the inlet opening 24. Some materials being of a high reactivity need not be elevated to the temperatures which are experienced through the RF nozzle and hence need not be passed through the RF torch in order to be sufficiently activated for appropriate conversion. Where flow through the DC plasma torch occurs, whether or not any raw material is fed through the RF torch and/or through the inlet opening 24, such flow through the DC torch may also be absent of raw material fed through the precursor feeder 2. It may only be the primary and reaction gases that pass through the DC torch to be delivered into the reaction chamber 8.

Packaging

A first purpose of reaction in the second chamber 8 is for the packaging or coating of the first formed nano particles by a material or materials from one or both of two sources of feed material (i.e. the RF flow stream or the material inlet 24). Packaging is an important aspect in nano powder production. Certain materials when converted into a nano particle will become very reactive. Such reactivity may be by oxidation upon exposure to the atmosphere. With the reduction is size, the relative surface is significantly increased and some material may oxidise with great exothermic reaction to cause explosion.

In the preferred form of the present invention, the first formed powder (preferably a nano powder) is delivered into the second reaction/nucleation chamber 8 from the DC plasma stream. A second material is delivered into the second reaction/nucleation chamber 8 via the RF plasma source. This source of material is delivered into an RF plasma zone from the precursor stock feed 1 by way of the precursor feeder 2 into the RF plasma torch 3. Such precursor material may be of a single material whether elemental or compound, or may be from a plurality of sources of material so as to simultaneously encourage the occurrence of alloying between such materials subsequent to their passing through the RF plasma torch. Indeed such alloying of materials through the RF torch 3 may occur whether or not there is a packaging to take place in chamber 8. The RP source plasma flow is delivered into the second reaction/nucleation chamber 8 at a temperature where such remains in an elevated temperature state (ie an ionised vapour state) and is capable of becoming applied to the surface of the particles generated from the DC source plasma stream. The RF plasma torch is utilised for coating materials which have a high vaporisation temperature in order for the vaporisation to occur subsequent to which they may be deposited onto the surface of the particles from the DC source.

In addition or in the alternative, material may be fed into the second reaction/nucleation chamber 8 from a second source 16 via the inlet 24. A material from this second source 16 may be of a kind which does not require such to be subjected to RF plasma energy for such material to become reactive or phase changed to be deposited onto the nano particles from the DC source. Feeder 16 may include a pre-heater for elevating the temperature of the material to be fed through the inlet 24.

The first material delivered to the second reaction/nucleation chamber 8 from the DC plasma torch source, is capable of being subjected to plasma energy from the RF plasma source 3 whether such is delivering vaporised material to be deposited or not. With reference to FIG. 2, the second plasma source 3 is preferably an RF plasma torch. RF-plasma uses its high frequency to induce voltage and hence generate plasma. The RF plasma torch operates at frequencies of say 4 mHz.

The material from the DC plasma torch source (called "the core material" when referred to with reference to packaging) being subjected to the RF plasma flame 22 from the RF plasma torch 3 can allow for the core material to be surface activated. Such surface activation is preferably to an extent such that the packaging material also introduced into the second reaction/nucleation chamber 8 is (whether this is itself activated by the RP plasma torch or not) able to bind with the core material. Surface activation may be to the extent that the core material (at its surface) increases its reactivity, increasing the surface energy of the core material. It excites the chemical energy, thereby making it more reactive. Like the DC plasma torch, the RF plasma torch will include a means for introducing a primary gas. A secondary gas is also able to be introduced into the RF plasma torch for the same purpose as for the purposes of the secondary gas passing through the DC plasma torch.

The plasma torch 3 can present a plasma flame to the material in the reaction/nucleation chamber 8. In FIG. 2, the flame is shown to extend into the chamber 8 and such can also activate the core material coming into the chamber from the DC source. The system can also operate such that the core material remains sufficiently surface activated from the DC source without requiring the core material to be further activated by the RF plasma source to allow for it to be coated. It is possible that the quenched powder from the DC source may be still active enough to apply the coating without secondary activation.

Alloying

The second purpose is for alloying to occur. Whilst alloying preferably occurs in a single reaction chamber (either in chamber 5 from materials passed through torch 4 or in chamber 8 from materials passed through torch 3) there is a possibility that alloying of a mechanical kind (analogous to ball mill alloying) may be established within the apparatus of the present device. Alloying may occur in the reaction chamber 5 by passing of two materials through the plasma torch 4 and quenched alloy particles may be formed by passing through the nozzle 6 into the chamber 8. Alloying may also occur by encouraging sufficient activation of the particles from the DC source, within the reaction chamber 8 by the RF source 3 to occur when upon a mixing of material passed through the RF source will result in alloying of a material occurring within the reaction chamber 8.

Process after Reaction (if any) in Chamber 8.

In an alternative to packaging or alloying as described above, the RF torch may be used to react at least one source of raw material and appropriate reaction gas(es) to react such in the reaction chamber 8 (and optionally form an alloy and/or coat it with material delivered via inlet 24) before passing such through the C-V nozzle 9.

The C-V nozzle 9 may include a like vortex generator set-up as that of nozzle 6 to aid in cooling and provide the other advantages to encourage is good throughput of material. Additional gas injection may occur at point 60 or points 60 at the entrance to the C-V nozzle. Such injection may serve the purpose of cooling the wall of the C-V nozzle and to keep it clean. Such an introduction of gas may be a precursor to the provision of the vortex generated at or proximate the throat of the C-V nozzle. A like injection of gas may also occur through the nozzle 6.

Downstream of the C-V nozzle 9 may be a collection chamber 11. This collection chamber may merely be a chamber where the powder is collected for subsequent removal or may be a chamber where further treatment may occur. Such further treatment may include additional coating by materials of less that 250 degrees celcius. A material feeder/heater 13 may remove from the chamber 11 the produced powder coated by an additional material such as by a polymer vapour.

Post processing and/or handling may occur of the particles and may include apparatus such as a collection chamber 20, an exhaust expansion chamber 18, an evacuation blower 19 and an exhaust scrubber 17. The apparatus may include a support structure 14 and a means for gas control 21. Cooling apparatus such as a chiller 12 may deliver chilled fluid (preferably a gas) to the apparatus of the present invention including to the reaction chamber 8.

Whilst reference herein is made to creation of nano particles, it is to be appreciated that the output product may not be of a nano particle size. This is especially so for packaged product in that the total size thereof may be larger than a nano particle but the core may be a nano particle.

The advantages the hybrid system of the present invention may bring are the ability to produce nano particles of a composite or elemental material form, from a variety of different source materials and sizing/phases thereof, and to alloy elemental, compounds and composites of two or more source material. The invention can also produce a highly pure nano powder and of a well defined and consistent nano powder size. This can be done efficiently and economically and in mass quantities or continuously. Amorphous crystalline structures can be formed and can be produced to eliminate the need for any post processing being required such as pulverization for transportation in oxidation preventing atmospheres. It can produce nanopowder directly without going through the intermediate steps of washing and cleaning and can produce different types of powder through controlling the reactor environment through background gas. The particle sizing can be controlled through subsonic and/or transonic quench nozzle(s).

Whilst reference herein is predominantly made to nano particle sized powder, it will be appreciated that the particles produced from the process and the device of the present invention may not entirely or all be nano sized. In particular where particles (Preferably nano particles) have been packaged, the total size of the packaged particle may not be of a nano range size.

EXAMPLES

Example 1

Figure 5:
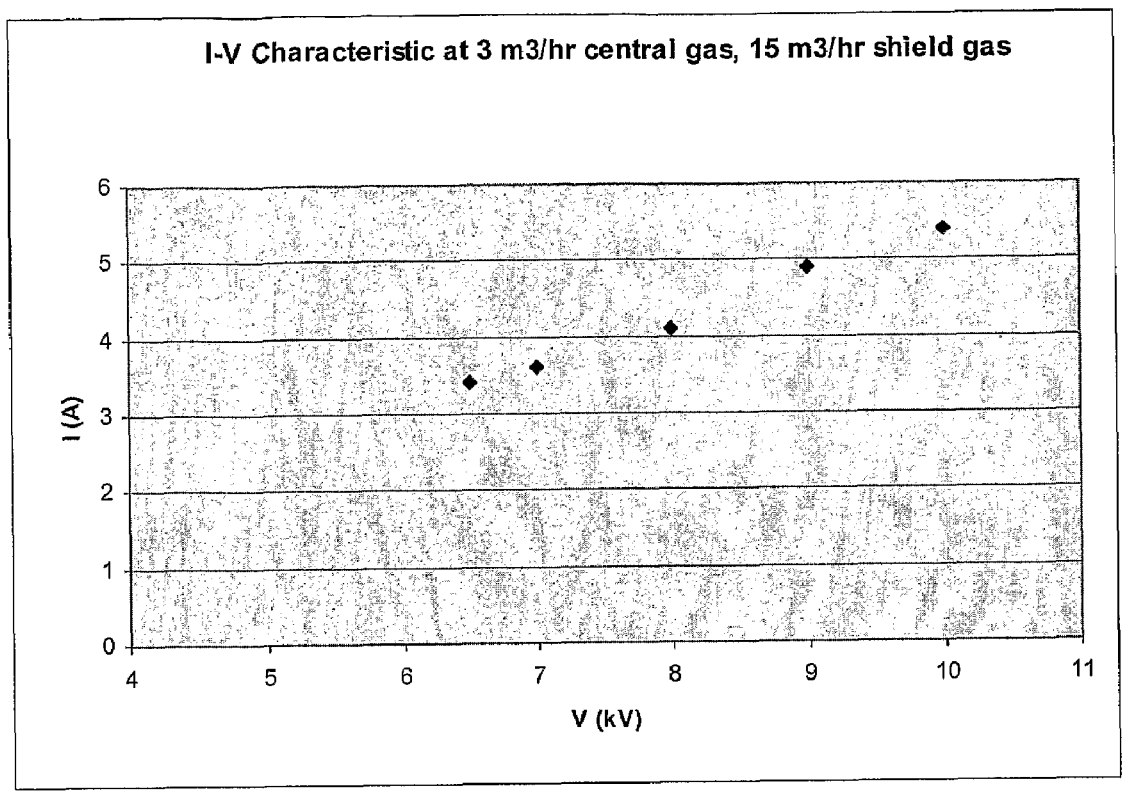
FIG. 5 is a plot of the I-V characteristics of flow through the RF torch and as further described with reference to example 1 hereinafter, but during a non operational mode (i.e. when no reaction gas(es) and raw materials are fed through the plasma torch and wherein the central gas is argon and the shield gas is oxygen (the shield gas, being the reaction gas when in an operating mode) being provided about the central gas)

FIG. 5 shows plot of the operational conditions of an RF torch (when in a steady flow but non processing condition) wherein a central gas flow rate of 3 cubic meters per hour and a shield gas of 15 cubic meters per hour is provided. The shield gas is oxygen and the central gas is argon. It was found that operating a plate bias of less then 5.5 kV extinguished the plasma.

Example 2

Figure 6:
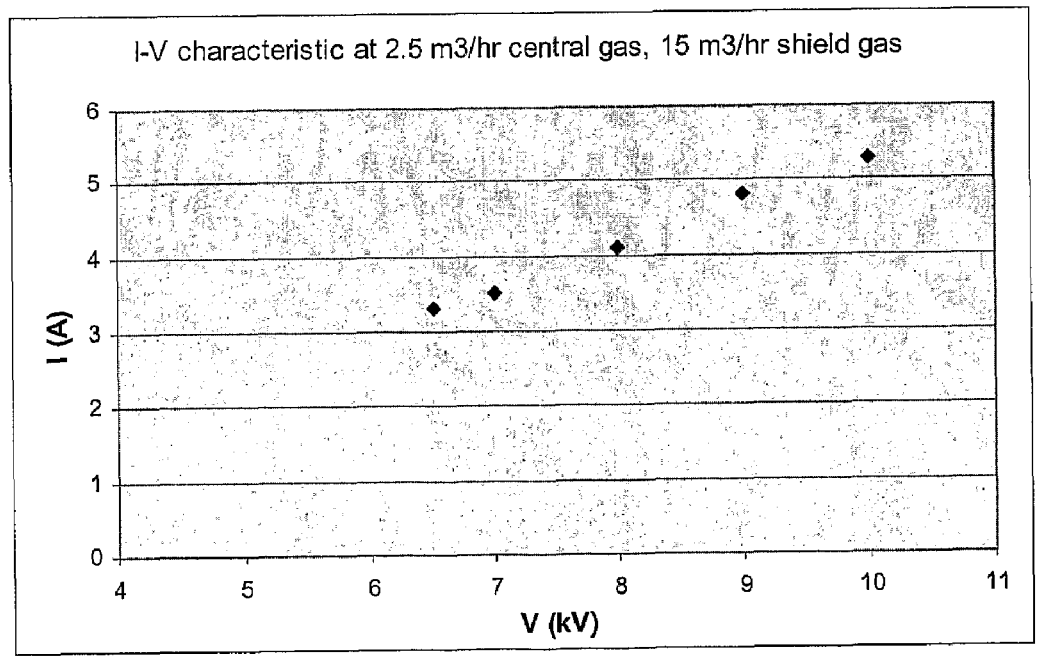
FIG. 6 is a plot of the I-V characteristics of flow through the RF torch and as further described with reference to example 2 hereinafter, but during a non operational mode (i.e. when no reaction gases and raw materials are fed through the plasma torch and wherein the central gas is argon and the shield gas is oxygen (the shield gas, being the reaction gas when in an operating mode) being provided about the central gas)

FIG. 6 shows a plot of the operational conditions of an RP torch (when in a steady flow but non processing condition) wherein a central gas flow rate of 2.5 cubic meters per hour and a shield gas of 15 cubic meters per hour is provided. The shield gas is oxygen and the central gas is argon. It was found that operating a plate bias of less then 6.5 kV extinguished the plasma.

Example 3

Figure 7:
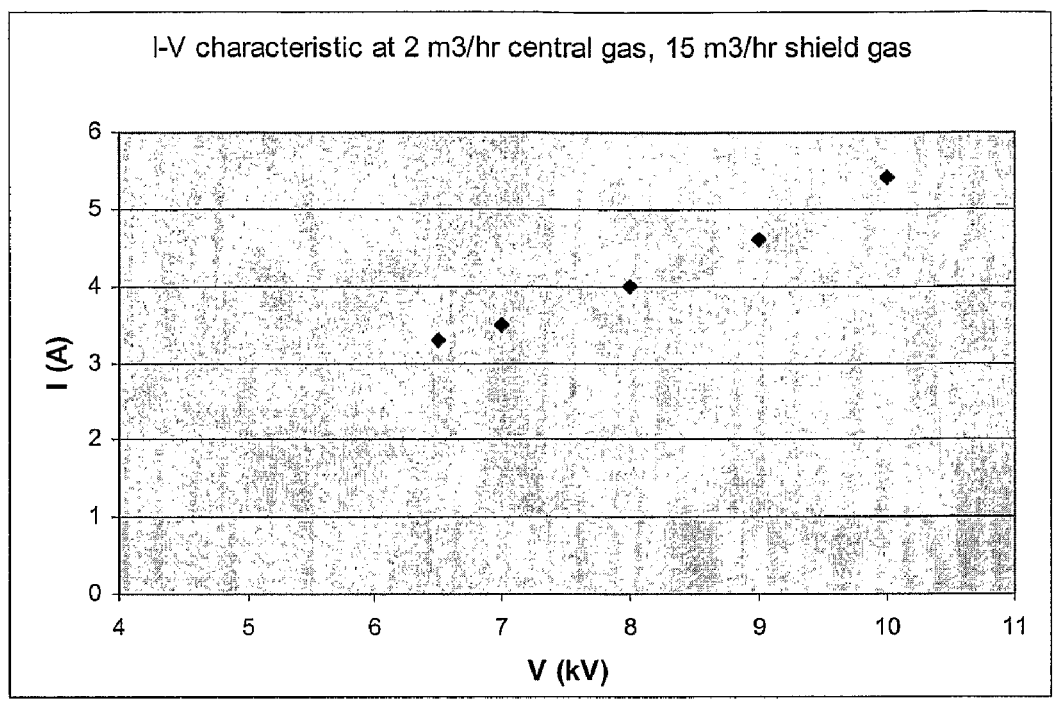
FIG. 7 is a plot of the I-V characteristics of flow through the RF torch and as further described with reference to example 3 hereinafter, but during a non operational mode (i.e. when no reaction gases and raw materials are fed through the plasma torch and wherein the central gas is argon and the shield gas is oxygen (the shield gas, being the reaction gas when in an operating mode) being provided about the central gas)
Figure 7A:
FIG. 7A is an electron microscope image of zinc oxide whisker tetrapod of a length of 200-300 nm and a rod width of approximately 20 nm.

FIG. 7 shows a plot of the operational conditions of an RF torch (when in a steady flow but non processing condition) wherein a central gas flow rate of 2 cubic meters per hour and a shield gas of 15 cubic meters per hour is provided.

FIG. 8 shows a IV plot of the DC plasma torch in operation where a shielding gas flow rate of 0.4 g/s of argon is established and a 4 g/s flow rate of nitrogen is established for plot 1 and where a shielding gas flow rate of 0.4 g/s of argon is established and a 3 g/s flow rate of nitrogen is established for plot 2.

Example 4

Production of Hydroxyapatite (HA) Particles

The preferred method for producing HA powder from its slurry involves preparing the slurry by mixing calcium hydroxide and phosphorous acid. This slurry is injected into the RF plasma plume through an atomizing nozzle. Either plasma, RF or DC can be used but RF plasma is preferred due to less contamination. Down stream dry gas injection is important (the gas injection is further downstream along the piping and not shown in the drawing. Their objective, in general is to help to carry the powder to the collector and, also reduce the humidity in the fluid stream in this particular example). Injection port 24 was used for feeding the raw material.

| Operating parameters: | |
|---|---|
| Frequency: | 4 MHz |
| Primary (central) gas: | Argon with 2.2-m³/hr |
| Secondary (shield) gas: | Oxygen with 9- m³/hr |
| Power: | 28-kW |
| Slurry feeding: | 2-l/hr |
| Output rate of powder: | >0.25 kg/hr |

Figure 10:
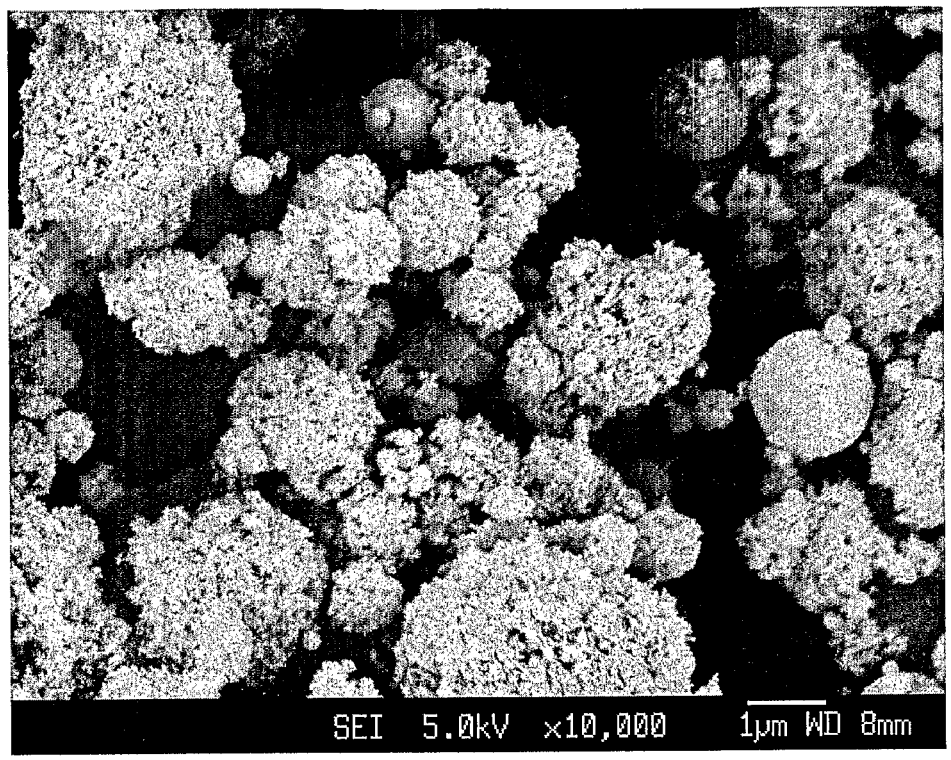
FIG. 10 is an FESEM micrograph according to example 4 of synthesised HA nano structure and partially sintered porous powder wherein the median agglomerated powder size is less than 2 microns while its fine structure is around 40-70 nm.

Two distinctive powder structures can be obtained depending on the slurry injection location. When the slurry was injected around the plasma, partially sintered nano-structured porous HA powders were obtained. The median of agglomerated powder size is <2-µm while its fine structure is around 40-70-nm, (see FIG. 10).

Figure 11:
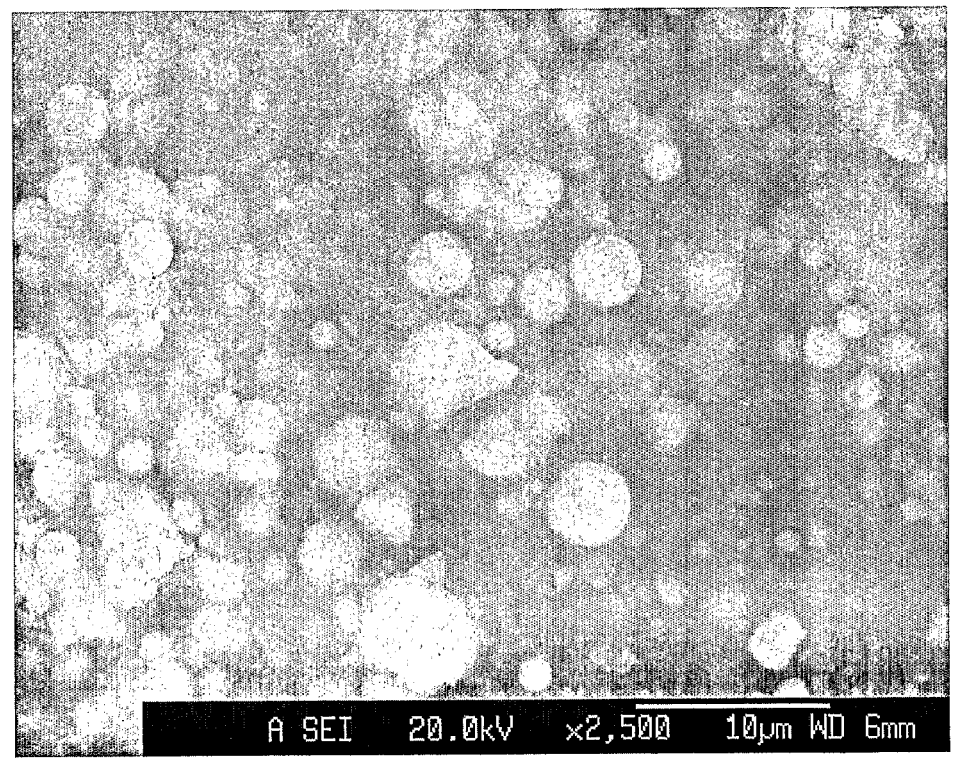
FIG. 11 is an FESEM micrograph according to example 4 of synthesised HA fully sintered pack powder.
Figure 14:
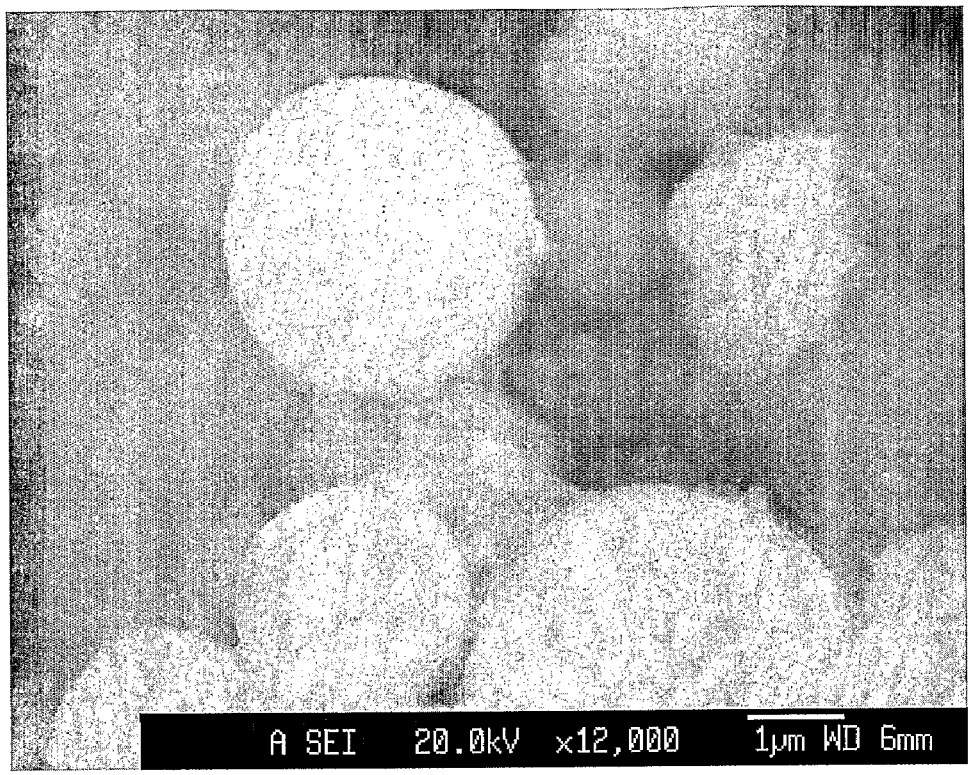
FIG. 14 is an FESEM micrograph according to example 4 of the synthesised HA fully sintered pack powder.

However, when the slurry was injected into the plasma plume, the fully sintered HA powders were obtained. The median of the sintered powder is also around 1.8-µm, see FIGS. 11 and 14.

Example 5

Zinc Oxide Whisker & Tetra-Pods Production

Zinc oxide whisker and tetra-pods can be directly produced from zinc metal powder from the system. The zinc metal powder is fed through the central of the RF plasma plume. The plasma is maintained by argon as primary (central) gas and oxidizing gas as the secondary (process gas). The process gas can be any oxygen contained gas but it is preferred to have oxygen content ranges from 3%-20%. The plasma plume can be generated either from DC or RF but in this circumstance, RF plasma is used and the powder is fed from port 2.

| The operating parameters: | |
|---|---|
| Frequency: | 4 MHz |
| Primary (central) gas: | Argon with 0.5-m³/hr |
| Secondary (process) gas: | 15- m³/hr with oxygen content of 17% |
| Nozzle gas injection: | 8- m³/hr of process gas |
| Power: | 27-kW |
| Powder federate: | 2-kg/hr |
| Output rate of powder: | >1.8 kg/hr |

Figure 12:
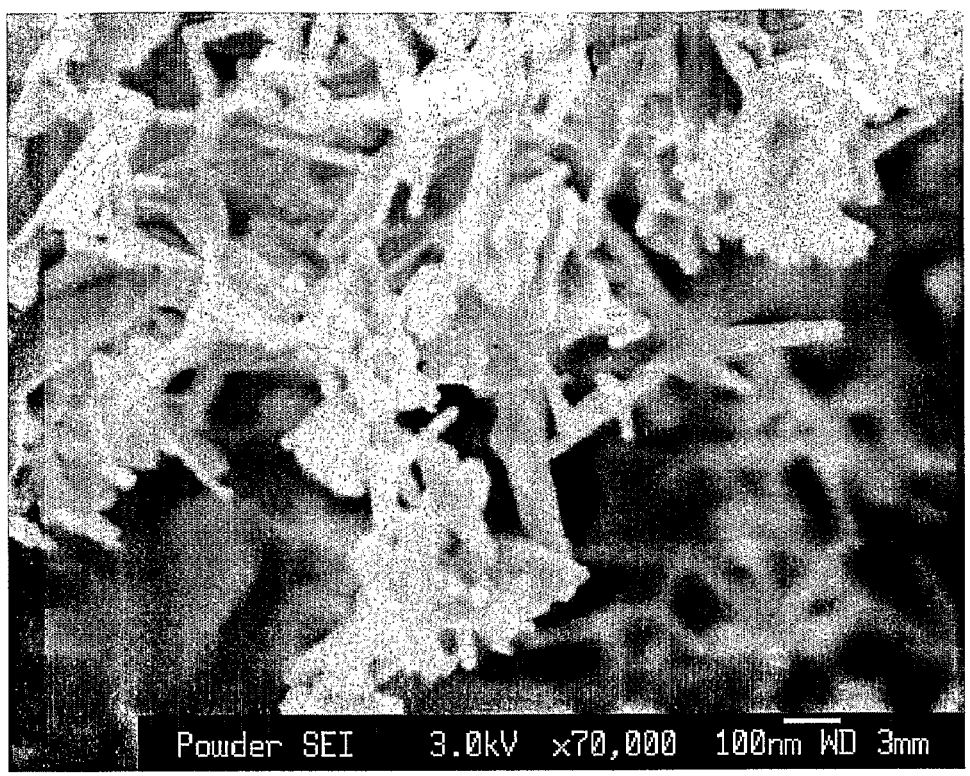
FIG. 12 is synthesised ZnO according to example 5 wherein the majority of the whisker and tetrapods are of a size no greater than 50 nm in diameter and no greater than 500 nm in length.
Figure 15:
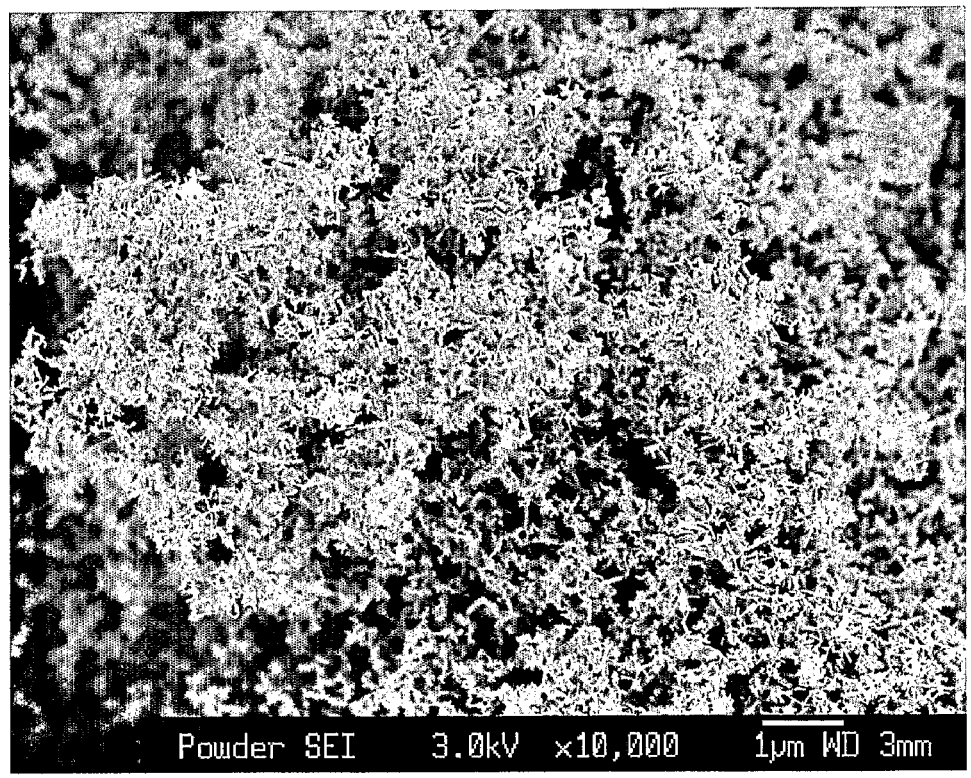
FIG. 15 is a broader view of the product of FIG. 12.

FIGS. 12 and 15 show the field emission scanning electron micrograph of the synthesized powder and they show not in particulate form. Majority of whisker and tetra-pods come with size of <50-nm diameter and <500-nm in length.

Example 6

Silicon Dioxide (SiO$_2$) Production

Silicon dioxide powder was produced by reacting the plasma dissociated silicon tetra-chloride (SiCl$_4$) vapor and oxygen content process gas. The plasma is maintained by argon as primary (central) gas and oxidizing gas as the secondary (process gas). The process gas can be any oxygen contained gas but it is preferred to have oxygen content >80%. The plasma plume can be generated either from DC or RP but in this circumstance, RF plasma is used and the SiCl$_4$ vapor was fed through feeding 24.

| The operating parameters: | |
|---|---|
| Frequency: | 4 MHz |
| Primary (central) gas: | Argon with 1.8-m³/hr flow-rate |
| Secondary (process) gas: | Oxygen with 10- m³/hr flow-rate |
| Nozzle gas injection: | 10- m³/hr of process gas |
| Power: | 30-kW |
| Federate: | 5.5-kg/hr |
| Output rate of powder: | >1 kg/hr |

Figure 13:
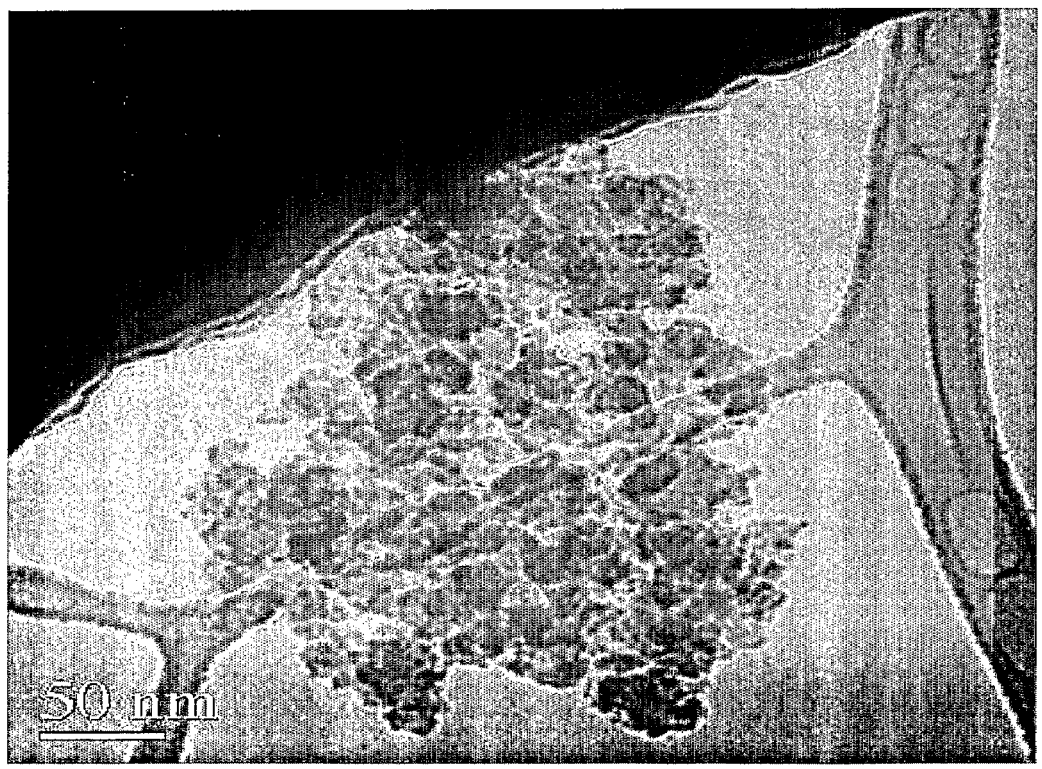
FIG. 13 is an image of a transmission electron micrograph of produced $SiO_2$ powder according to example 6 wherein the particulate size is in the order of 30 nm and is mainly amorphous structured.

FIG. 13 shows the transmission electron micrograph of the produced SiO$_2$ powder. The particulate size is on the order of 30-nm and it is mainly amorphous structured.

The invention claimed is:

1. A vapourised flow quenching reactor for producing a fine-powder from one or more reactant materials comprising
   (1) first heat creating means selected from one of a DC plasma torch and RF plasma torch, said first heat creating means including
      (i) a reactant stream inlet for at least one input material selected from at least one gas phase and at least one non gas phase material, said non gas phase material to be vapourised by said first heat creating means and
      (ii) a reactant stream outlet
   (2) a first reaction chamber to receive said gaseous reactant stream from said reactant stream outlet of said first heat creating means wherein in said first reaction chamber said mixing and/or reaction of said reactant stream occurs, said first reaction chamber including an outlet for said reactant stream
   (3) a first convergent-divergent nozzle to receive via an inlet thereof said reactant stream from said outlet of said first reaction chamber to rapidly cool the reactant stream axially flowing there through, as a result of adiabatic and is entropic expansion of the reactant stream, said first convergent-divergent nozzle including an outlet for said reactant stream
   (4) a second reaction chamber including
      (i) a first inlet to receive said reactant stream of material from said outlet of said first convergent-divergent nozzle, and
      (ii) a second inlet for delivery of a second reaction stream into said second reaction chamber, said second reaction stream having been generated by second heat creating means selected from one of a DC plasma torch and RF plasma torch, said second heat creating means including
         (a) a reactant stream inlet for at least one input material selected from at least one gas phase and at least one non gas phase material, said non gas phase material to be vapourised by said second heat creating means and (b) a second reactant stream outlet to deliver said second reactant stream via said second inlet of said second reaction chamber, into said second reaction chamber, and (iii) an outlet of said second reaction chamber (5) a second convergent-divergent nozzle to receive via an inlet thereof said resultant reactant stream (resultant from said first and/or second reactant streams) from said outlet of said second reaction chamber to rapidly cool the resultant reactant stream axially flowing there through as a result of adiabatic and is entropic expansion of the resultant reactant stream, said second convergent-divergent nozzle including an outlet for said reactant stream (6) a collection chamber to receive material from said outlet of said second convergent-divergent nozzle.

2. A vapourised flow quenching reactor as claimed in claim 1 wherein said second reaction chamber includes a third inlet to receive a non vapourised material.

3. A vapourised flow quenching reactor as claimed in claim 2 wherein said second inlet to said second reaction chamber allows said second heat creating means to extend its heat source into said second reaction chamber to active by heating at least part of any non or partially activated material within said second reaction chamber other than that delivered into said second reaction chamber via at least one of said second inlet and third inlet of said second reaction chamber for the purposes of allowing such material to subsequently react with other material introduced into said second reaction chamber via at least one of said first inlet and said second inlet and said third inlet of said second reaction chamber.

4. A vapourised flow quenching reactor as claimed in claim 2 wherein said third inlet is presented to said second reaction chamber to direct flow of material there through into the path of flow of the reactant stream from said second inlet.

5. A vapourised flow quenching reactor as claimed in claim 2 wherein said third inlet is presented to said second reaction chamber to direct flow of material there through, and not into the path of flow of the reactant stream from said second inlet.

6. A vapourised flow quenching reactor as claimed in claim 2 wherein flow through said third inlet to said second reaction chamber is adiustable.

7. A method of using a vapourised flow quenching reactor as claimed in claim 2 for forming a packaged powder said method comprising;

passing a vapourised material created by passing the reactant material by said first heat creation means from said first reaction chamber through said first convergent/divergent nozzle to create a nano particle powder material which is delivered via said first inlet of said second reaction chamber, wherein said nano particles are surface reacted by said second heat creation means to allow the reaction of said nano particles with a packaging material introduced into said second reaction chamber via at least one of said second inlet and said third inlet to become packaged by said packaging material, wherein after said packaged nano particles are passed through said second reaction chamber, then said packaged nano particles are passed through said second convergent-divergent nozzle for collection in said collection chamber.

8. A method of using a vapourised flow quenching reactor as claimed in claim 2 for forming an alloyed powder said method comprising;

passing at least two vapourised materials created by passing the reactant material by said first heat creation means from said first reaction chamber through said first convergent/divergent nozzle to create an alloyed nano particle powder material which is delivered via said first inlet of said second reaction chamber.

9. A method of forming a packaged powder using a vapourised flow quenching reactor as claimed in claim 2 said method comprising;

passing a vapourised material created by passing the reactant material by said first heat creation means from said first reaction chamber through said first convergent/divergent nozzle to create a nano particle powder material which is delivered via said first inlet of said second reaction chamber, wherein said nano particles are surface reacted by said second heat creation means to allow the reaction of said nano particles with a packaging material introduced into said second reaction chamber via at least one of said second inlet and said third inlet to become packaged by said packaging material, wherein after said packaged nano particles are passed through said second reaction chamber, then said packaged nano particles are passed through said second convergent-divergent nozzle for collection in said collection chamber.

10. A method of forming an alloyed powder using a vapourised flow quenching reactor as claimed in claim 2 said method comprising; passing at least two vapourised materials created by passing the reactant material by said first heat creation means from said first reaction chamber through said first convergent/divergent nozzle to create an alloyed nano particle powder material which is delivered via said first inlet of said second reaction chamber.

11. A vapourised flow quenching reactor as claimed in claim 1 wherein said second reaction chamber includes a third inlet to receive a non vapourised material to be heated by said second heat creating means within said second reaction chamber.

12. A vapourised flow quenching reactor as claimed in claim 1 wherein said second inlet to said second reaction chamber allows said second heat creating means to extend its heat source into said second reaction chamber to active by heating at least part of any non or partially activated material within said second reaction chamber other than that delivered into said second reaction chamber via said second inlet of said second reaction chamber for the purposes of allowing such material to subsequently react with other material introduced into said second reaction chamber via at least one of said first inlet and said second inlet of said second reaction chamber.

13. A vapourised flow quenching reactor as claimed in claim 1, wherein said first heat creating means is a DC plasma torch.

14. A vapourised flow quenching reactor as claimed in claim 1 wherein said first heat creating means is an RF plasma torch.

15. A vapourised flow quenching reactor as claimed in claim 1 wherein said second heat creating means is an RF plasma torch.

16. A vapourised flow quenching reactor as claimed in claim 1 wherein said second heat creating means is a DC plasma torch.

17. A vapourised flow quenching reactor as claimed in claim 1, wherein a collection chamber is positioned intermediate of the outlet of said first convergent-divergent and said first inlet of said second reaction chamber.

18. A vapourised flow quenching reactor as claimed in claim 1, further comprising a vortex generator positioned in said first inlet to said second reaction chamber.

19. A vapourised flow quenching reactor as claimed in claim 1, wherein reactor can be operated in
  i. a first mode wherein reactant flow through said first heat creating source is established and reactant flow through said second heat creating source is established, and
  ii. a second mode wherein reactant flow through said first heat creating source is established and no reactant flow through said second heat creating source is established.

20. A vapourised flow quenching reactor as claimed in claim 1 wherein reactor can be operated in
  i. a first mode wherein reactant flow through said first heat creating source is established and reactant flow through said second heat creating source is established, and
  ii. a third mode wherein no reactant flow through said first heat creating source is established and reactant flow through said second heat creating source is established.

21. A vapourised flow quenching reactor as claimed in claim 20 wherein reactor can be operated in
  i. the first mode wherein reactant flow through said first heat creating source is established and reactant flow originating from said second heat creating source is established, and
  ii. a fourth mode wherein reactant flow through said first heat creating source is established and no reactant flow from said second heat creating source is established and material is delivered via a third inlet to said second reaction chamber.

22. A vapourised flow quenching reactor as claimed in claim 21, wherein reactor can be operated in
  i. a fifth mode wherein reactant flow through said first heat creating source is established and reactant flow originating from said second heat creating source is established, and material is delivered via said third inlet to said second reaction chamber and
  ii. a second mode wherein reactant flow through said first heat creating source is established and no reactant flow from said second heat creating source is established.

23. A vapourised flow quenching reactor as claimed in claim 22 wherein reactor can be operated in
  i. the fifth mode wherein reactant flow through said first heat creating source is established and reactant flow originating from said second heat creating source is established, and material is delivered via said third inlet to said second reaction chamber and
  ii. the third mode wherein no reactant flow through said first heat creating source is established and reactant flow from said second heat creating source is established
  iii. wherein the reactor can be operated in any one or more combinations of said first, second, third, fourth and fifth modes.

24. A vapourised flow quenching reactor as claimed in claim 1, wherein said first convergent-divergent nozzle includes a means to inject a gas.

25. A vapourised flow quenching reactor as claimed in claim 24, wherein either or both said means to inject a gas is a means to inject said gas at a tangent to the axial direction of said nozzle in order to generate a rotational flow about said axial direction flow through said nozzle.

26. A vapourised flow quenching reactor as claimed in claim 24, wherein either of both said means to inject a gas introduce said gas into said nozzle at the throat of said nozzle.

27. A vapourised flow quenching reactor as claimed in claim 24, wherein said means to inject a gas includes a plurality of injection openings into said nozzle.

28. A vapourised flow quenching reactor as claimed in claim 1, wherein said second convergent-divergent nozzle includes a means to inject a gas.

29. A vapourised flow quenching reactor as claimed in claim 1, wherein said second convergent-divergent nozzle and said first convergent-divergent nozzle includes a means to inject a gas.

30. A vapourised flow quenching reactor as claimed in claim 1, wherein the flow of reactant through said second convergent/divergent nozzle is below supersonic speeds.

31. A vapourised flow quenching reactor as claimed in claim 1, wherein the flow of reactant through said first convergent/divergent nozzle is below supersonic speeds.

32. A vapourised flow quenching reactor as claimed in claim 1, wherein said at least one torch both vapourises and ionises said input material.

33. A method of using a vapourised flow quenching reactor as claimed in claim 1 for forming a packaged powder said method comprising;
  passing a vapourised material created by passing the reactant material by said first heat creation means from said first reaction chamber through said first convergent/divergent nozzle to create a nano particle powder material which is delivered via said first inlet of said second reaction chamber,
  wherein said nano particles are surface reacted by said second heat creation means to allow the reaction of said nano particles with a packaging material introduced into said second reaction chamber via said second inlet to become packaged by said packaging material,
  wherein after said packaged nano particles are passed through said second reaction chamber, then said packaged nano particles are passed through said second convergent-divergent nozzle for collection in said collection chamber.

34. A method of forming a packaged powder using a vapourised flow quenching reactor as claimed in claim 1 said method comprising;
  passing a vapourised material created by passing the reactant material by said first heat creation means from said first reaction chamber through said first convergent/divergent nozzle to create a nano particle powder material which is delivered via said first inlet of said second reaction chamber,
  wherein said nano particles are surface reacted by said second heat creation means to allow the reaction of said nano particles with a packaging material introduced into said second reaction chamber via said second inlet to become packaged by said packaging material,
  wherein after said packaged nano particles are passed through said second reaction chamber, then said packaged nano particles are passed through said second convergent-divergent nozzle for collection in said collection chamber.

35. A fine powder production process including a vapourised flow quenching reactor for producing a fine-powder from one or more reactant materials comprising
  (1) first heat creating means selected from one of a DC plasma torch and RF plasma torch, said first heat creating means including
    (i) a reactant stream inlet for at least one input material selected from at least one gas phase and at least one non gas phase material, said non gas phase material to be vapourised by said first heat creating means and
    (ii) a reactant stream outlet
  (2) a first reaction chamber to receive said gaseous reactant stream from said reactant stream outlet of said first heat creating means wherein in said first reaction chamber said mixing and/or reaction of said reactant stream occurs, said first reaction chamber including an outlet for said reactant stream (3) a first convergent-divergent nozzle to receive via an inlet thereof said reactant stream from said outlet of said first reaction chamber to rapidly cool the reactant stream axially flowing there through, as a result of adiabatic and is entropic expansion of the reactant stream, said first convergent-divergent nozzle including an outlet for said reactant stream (4) a second reaction chamber including
   (i) a first inlet to receive said reactant stream of material from said outlet of said first convergent-divergent nozzle, and
   (ii) a second inlet for delivery of a second reaction stream into said second reaction chamber, said second reaction stream having been generated by second heat creating means selected from one of a DC plasma torch and RF plasma torch, said second heat creating means including
      (a) a reactant stream inlet for at least one input material selected from at least one gas phase and at least one non gas phase material, said non gas phase material to be vapourised by said second heat creating means and
      (b) a second reactant stream outlet to deliver said second reactant stream via said second inlet of said second reaction chamber, into said second reaction chamber, and
   (iii) an outlet of said second reaction chamber (5) a second convergent-divergent nozzle to receive via an inlet thereof said resultant reactant stream (resultant from said first and/or second reactant streams) from said outlet of said second reaction chamber to rapidly cool the resultant reactant stream axially flowing there through as a result of adiabatic and is entropic expansion of the resultant reactant stream, said second convergent-divergent nozzle including an outlet for said reactant stream (6) a collection chamber to receive material from said outlet of said second convergent-divergent nozzle wherein said process has three modes of operation:

i. a first mode wherein reactant flow through said first heat creating means is established and reactant flow through said second heat creating means is established, and ii. a second mode wherein reactant flow through said first heat creating means is established and no reactant flow through said second heat creating means is established, and iii. a third mode wherein no reactant flow through said first heat creating means is established and reactant flow from said second heat creating means is established.

36. A fine powder production process as claimed in claim 35
   wherein said second reaction chamber includes a third inlet to receive a non vapourised material and
   further comprising
   i. a fourth mode wherein reactant flow through said first heat creating means is established and no reactant flow from said second heat creating means is established and material is delivered via said third inlet to said second reaction chamber.

37. A fine powder production process as claimed in 36
   further comprising
   i. a fifth mode wherein reactant flow through said first heat creating means is established and reactant flow originating from said second heat creating means is established, and material is delivered via said third inlet to said second reaction chamber.

38. A fine powder production process as claimed in claim 35 wherein said first convergent-divergent nozzle includes a means to inject a gas to generate a rotational flow about the axial direction flow through said third nozzle.

39. A fine powder production process as claimed in claim 35 wherein said second convergent-divergent nozzle includes a means to inject a gas to generate a rotational flow about the axial direction flow through said second nozzle.

40. A convergent-divergent nozzle for quenching the flow of a heated gas flow entrained vapourised material for the purposes of producing a nano sized particle containing powder as a consequence of the rapid quenching of said vapourised material passing through said convergent-divergent nozzle, said convergent-divergent nozzle comprising:
   a means to affect the flow path of said heated gas flow entrained vapourised material through said convergent said convergent-divergent nozzle which includes
      a means to inject a flow modifying gas into the flow path of said heated gas flow entrained vapourised material upstream of a divergent portion of said convergent-divergent nozzle which is injected via at least one delivery opening at an angle having a tangential component to the axial direction of said convergent-divergent nozzle;
   wherein said the flow modifying gas is injected via at least one opening of said nozzle into the flow path of said heated gas flow entrained vapourised material at the throat of said nozzle.

41. A convergent-divergent nozzle as claimed in claim 40 wherein said means to inject includes a plurality of delivery openings for injection of said flow modifying gas.

42. A convergent-divergent nozzle as claimed in claim 40 wherein said means to inject is able to adjust the angle of said tangential component of flow to the path of said heated gas flow entrained vapourised material.

43. A convergent-divergent nozzle as claimed in claim 40 wherein said nozzle is one for operating at sub supersonic speeds.

* * * * *